(12) United States Patent
Bhave et al.

(10) Patent No.: US 9,069,004 B2
(45) Date of Patent: Jun. 30, 2015

(54) OPTOMECHANICAL SENSORS BASED ON COUPLING BETWEEN TWO OPTICAL CAVITIES

(71) Applicant: Cornell University, Ithaca, NY (US)

(72) Inventors: Sunil A. Bhave, Ithaca, NY (US); David Neil Hutchison, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/350,542

(22) PCT Filed: Oct. 8, 2012

(86) PCT No.: PCT/US2012/059255
§ 371 (c)(1),
(2) Date: Apr. 8, 2014

(87) PCT Pub. No.: WO2013/052953
PCT Pub. Date: Apr. 11, 2013

(65) Prior Publication Data
US 2014/0283601 A1   Sep. 25, 2014

Related U.S. Application Data

(60) Provisional application No. 61/545,144, filed on Oct. 8, 2011.

(51) Int. Cl.
*G01B 9/02* (2006.01)
*G01P 15/093* (2006.01)
*G01B 11/14* (2006.01)
*G01P 3/36* (2006.01)
*G01P 15/08* (2006.01)

(52) U.S. Cl.
CPC ............. *G01P 15/093* (2013.01); *G01B 11/14* (2013.01); *G01P 3/36* (2013.01); *G01P 15/0888* (2013.01)

(58) Field of Classification Search
CPC ..... G01P 15/093; G01P 15/0888; G01P 3/36; G01B 11/14; G01B 9/02023
USPC .......................................................... 356/480
See application file for complete search history.

(56) References Cited

U.S. PATENT DOCUMENTS

| | | | |
|---|---|---|---|
| 6,507,684 B2 * | 1/2003 | Tapalian et al. | 385/30 |
| 6,657,731 B2 * | 12/2003 | Tapalian et al. | 356/480 |
| 6,668,111 B2 * | 12/2003 | Tapalian et al. | 385/28 |
| 6,765,211 B2 * | 7/2004 | Tapalian et al. | 250/339.07 |
| 6,928,875 B2 | 8/2005 | Bickford et al. | |
| 7,532,790 B2 * | 5/2009 | Smith et al. | 385/32 |
| 7,583,874 B2 * | 9/2009 | Rakich et al. | 385/32 |
| 7,622,705 B2 * | 11/2009 | Fan et al. | 250/216 |
| 7,623,556 B2 | 11/2009 | Ferrari et al. | |
| 7,626,707 B2 * | 12/2009 | Carr | 356/519 |

(Continued)

*Primary Examiner* — Tarifur Chowdhury
*Assistant Examiner* — Jonathon Cook
(74) *Attorney, Agent, or Firm* — Perkins Coie LLP

(57) ABSTRACT

Methods, structures, devices and systems are disclosed for implementing optomechanical sensors in various configurations by using two optically coupled optical resonators or cavities that can be move or deform relative to each other. The optical coupling between first and second optical cavities to produce an optical resonance that varies with a spacing between the first and second optical cavities and provide the basis for the optomechanical sensing. Compact and integrated optomechanical sensors can be constructed to provide sensitive measurements for a range of applications, including motion sensing and other sensing applications.

45 Claims, 23 Drawing Sheets

(56) References Cited

U.S. PATENT DOCUMENTS

| | | | |
|---|---|---|---|
| 8,115,937 B2* | 2/2012 | Needham | 356/506 |
| 2002/0079453 A1* | 6/2002 | Tapalian et al. | 250/343 |
| 2002/0114563 A1* | 8/2002 | Tapalian et al. | 385/30 |
| 2003/0206693 A1* | 11/2003 | Tapalian et al. | 385/28 |
| 2008/0163686 A1 | 7/2008 | Carr | |
| 2009/0109423 A1* | 4/2009 | Carr | 356/73 |
| 2009/0268211 A1* | 10/2009 | Carr et al. | 356/498 |
| 2012/0099114 A1* | 4/2012 | Carr et al. | 356/498 |
| 2012/0164027 A1* | 6/2012 | Murray et al. | 422/69 |
| 2012/0257209 A1* | 10/2012 | Andersen et al. | 356/477 |

* cited by examiner

Fundamental "even" TE mode

Fundamental "odd" TE mode

Second "even" TE mode

···etc

Second "odd" TE mode

···etc

OPTOMECHANICAL SENSORS BASED ON COUPLING BETWEEN TWO OPTICAL CAVITIES

PRIORITY CLAIM AND RELATED PATENT APPLICATION

This patent document is a 35 U.S.C. 371 National Stage application of International Application No. PCT/US2012/059255 filed Oct. 8, 2012, which claims the priority of U.S. provisional application No. 61/545,144 entitled "ACCELEROMETER BASED ON COUPLING BETWEEN TWO OPTICAL CAVITIES" filed on Oct. 8, 2011. The entire disclosures of the above applications are incorporated by reference as part of this document.

STATEMENT OF GOVERNMENT SUPPORT

This invention was made with government support under Contract No. 3001592878 awarded by Defense Advanced Research Projects Agency (DARPA). The government has certain rights in the invention.

BACKGROUND

This patent document relates to optomechanical sensors, including, e.g., sensing of spacing variation and sensing of motion including acceleration and rotation.

Detection of spacing variation and motion can have important applications. For example, the acceleration of an object is a useful parameter for a wide range of applications. Accelerometers can be used for motion sensing, motion control, navigation of objects and vehicles (e.g., aircraft, watercraft and land vehicles), mobile computers and mobile communication devices, electronic games, various interactive systems and others.

SUMMARY

Techniques, systems, and devices are disclosed for sensing spacing variation and motion or other parameters based on optomechanical sensors in various configurations by using two optically coupled optical resonators or cavities that can move or deform relative to each other. The optical coupling between first and second optical cavities to produce an optical resonance that varies with a spacing between the first and second optical cavities and provide the basis for the optomechanical sensing. Compact and integrated optomechanical sensors can be constructed to provide sensitive measurements for a range of applications, including motion sensing and other sensing applications.

In one aspect, a device for optomechanical sensing is provided to include a substrate on which a first optical cavity is fixed; a second optical cavity separated from the first optical cavity by a distance that provides optical coupling between first and second optical cavities to produce an optical resonance that varies with a spacing between the first and second optical cavities; a suspension coupled between the first and second optical cavities to allow the second optical cavity to move or deform with respect to the first optical cavity under action of a force to change the spacing between the first and second optical cavities; an optical coupler that couples light into the first and second optical cavities; and a detection unit that detects a change in the optical resonance with respect to the spacing between the first and second optical cavities to measure motion based on the detected change.

In another aspect, a method for optomechanical sensing is provided to include directing light into at least one of a first optical cavity and a second optical cavity that are optically coupled to each other and are structured to allow one to deform or move with respect to the other; coupling light out of the first and second optical cavities as sensor light; using the sensor light to detect a change in the optical resonance effectuated by the optical coupling between the first and second optical cavities with respect to a spacing between the first and second optical cavities caused by a motion; and using the detected change in the optical resonance to measure the motion.

In another aspect, a device for optomechanical sensing is provided to include a substrate; a first optical cavity formed on the substrate; a second optical cavity separated from the first optical cavity and optically coupled to the first optical cavity to enable an optical resonance that varies with a spacing between the first and second optical cavities, wherein the second optical cavity is configured to move or deform with respect to the first optical cavity under action of a force to change the spacing between the first and second optical cavities; an optical coupler that couples light into the composite optical resonator; and a detection unit that detects a change in the optical resonance with respect to the spacing between the first and second optical cavities to measure motion based on the detected change in one or more directions within a plane parallel to the substrate.

In another aspect, a device for optomechanical sensing is provided to include a substrate; a first structure coupled to the substrate to include a region having photonic crystal cavities to effectuate a first optical cavity; a second structure coupled to the substrate to include a region having photonic crystal cavities to effectuate a second optical cavity that is located near the first optical cavity to enable optical coupling between the first and second optical cavities to produce an optical resonance that varies with a spacing between the first and second optical cavities, the second structure being coupled to the substrate to enable the second structure to move relative to the first structure in response to a force or motion; and a detection unit that is coupled to receive light from the first or second optical cavity and detects a change in the optical resonance with respect to the spacing between the first and second optical cavities from the received light.

In another aspect, a device for optomechanical sensing is provided to include a vibrating mass; a driving oscillator coupled to the vibrating mass to drive the vibrating mass to oscillate along a driving axis; an optomechanical sensor coupled to the vibrating mass to measure a change in position of the vibrating mass along a sensing axis that is different from the driving axis, the optomechanical sensor including first and second optical resonators that are optically coupled to each other to collectively produce an optical resonance that changes with the change in position of the vibrating mass along the sensing axis, and an optical detector to measure light coupled of the first or second optical resonator indicating the change in position of the vibrating mass; and a circuit that processes output of the optical detector of the optomechanical sensor to obtain rotation information of the device based on coupling between motion of the vibrating mass along the driving axis and motion of the vibrating mass along the sensing axis caused by rotation of the device.

In another aspect, a method for measuring acceleration is provided to include directing light into at least one of a first optical cavity and a second optical cavity that are optically coupled to each other to form a composite optical resonator and are structured to allow one to deform or move with respect to the other; coupling light out of the first and second optical cavities as a sensor light; using the sensor light to detect a change in the optical resonance of the composite optical resonator with respect to a spacing between the first and second optical cavities caused by an acceleration; and using the detected change in the optical resonance to measure the acceleration.

In yet another aspect, a device capable of measuring acceleration is provided to include a substrate on which a first optical cavity is fixed; a second optical cavity separated from the first optical cavity by a distance that provides optical coupling between first and second optical cavities to form a composite optical resonator that exhibits an optical resonance that varies with a spacing between first and second optical cavities; a suspension coupled between the first and second optical cavities to allow the second optical cavity to move or deform with respect to the first optical cavity under action of a force to change a spacing between first and second optical cavities; an optical coupler that couples light into the composite optical resonator formed by the first and second optical cavities; and a detection unit that detects a change in the optical resonance with respect to the spacing between first and second optical cavities to measure acceleration based on the detected change.

These and other aspects and their implementations are described in greater detail in the attached drawing, the description and the claims.

BRIEF DESCRIPTION OF THE DRAWINGS

Like reference symbols and designations in the various drawings indicate like elements.

DETAILED DESCRIPTION

Figure 1A:
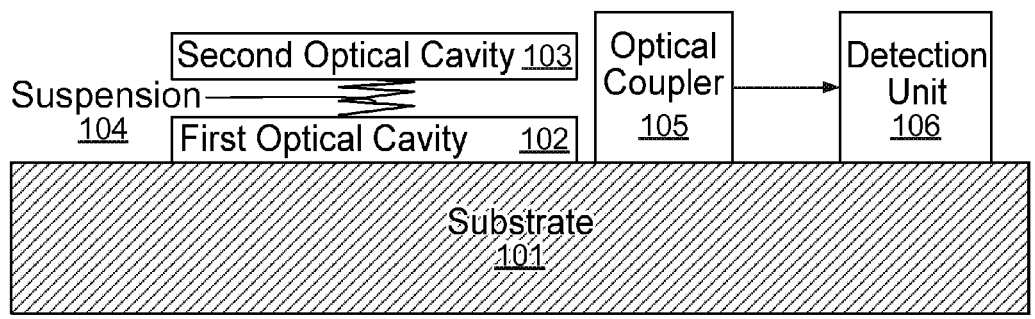
FIGS. 1A and 1B show the structure and optical sensing of an exemplary optomechanical sensor device capable of measuring motion based on one implementation of the disclosed technology.

Optical sensing can be implemented to provide highly sensitive measurements based on various optical mechanisms. Optical sensing has been shown to yield a sensing sensitivity of sub-fm/Hz$^{1/2}$ at room temperature in a variety of previous micromechanical oscillators and can be more sensitive to mechanical displacement than electrostatics for a given transduction area. An optical resonator can confine light under a resonance condition. A property of the confined light in the optical resonator can change when the resonance condition changes or the optical condition of the resonator changes. For example, a change in the optical coupling of an optical resonator can change the confined light in the optical resonator. This change can be sensitive when the optical resonator has a high quality factor.

Two optical resonators can be optically coupled to each other in that the optical field of one optical resonator can affect the optical field in the other optical resonator. Two optical resonators can be optically coupled to each other by placing close to each other so that the optical fields of the two optical resonators spatially overlap to allow for optical energy transfer between the two optical resonators. Various optical coupling techniques can be used to effectuate the optical coupling between two optical resonators. As a specific example, the optical evanescent field of an confined optical mode of an optical resonator spatially extends outside the optical resonator and thus can spatially overlap with the optical evanescent field of an confined optical mode of another optical resonator to effectuate optical coupling between the two optical resonators when the two optical resonators are placed close to each other so that field strength of an evanescent field is sufficient to effect measurable inter-resonator optical coupling. When the spacing between the two optical resonators is changed, the spatial overlapping of the optical fields of the two optical resonators change accordingly and this change is reflected in the optical field in either one of the two coupled optical resonators. In addition, when one optical resonator of the two coupled optical resonators is changed in some way, e.g., the resonator's geometry, dimension or the optical refractive index, or the optical coupling condition, this change in the optical resonator can induce a change in the other coupled optical resonator even when the relative position between the two coupled optical resonators is not changed.

Techniques, systems, and devices described in this document use a change in the optical field in one of the two coupled optical resonators due to the relative position of the two coupled optical resonators or a change in one of the two coupled optical resonators for sensing spacing variation, motion, acceleration or other parameters of interest. In various embodiments in this document, at least one of the two coupled resonators is mechanically coupled to allow either the entire resonator or a part of the resonator to move or change its position relative to the other optical resonator that affects the optical coupling between the two optical resonators. To the extent that the change in the optical coupling between the two optical resonators for the sensing operation is associated with a mechanical property of the device or system, the sensing devices described in this document are referred to as optomechanical sensors in which the change in the optical coupling is caused by a mechanical shift in position or motion or a mechanical force.

The disclosed embodiments include examples that detect the relative spacing between the two optical resonators that are movably engaged to each other while being optically coupled to each other for motion sensing in accelerometers or in other sensing applications, including, e.g., rotational and translational motion parameters, such as relative position, velocity or acceleration. The disclosed optomechanical sensor techniques, systems, and devices include accelerometer devices and acceleration sensing methods. A method for measuring motion (e.g., including acceleration) includes directing light into at least one of a first optical cavity and a second optical cavity that are optically coupled to each other to form a composite optical resonator and are structured to allow one optical resonator to deform or move with respect to the other optical resonator, coupling light out of the first and second optical cavities as a sensor light, and using the sensor light to detect a change in the optical resonance of the composite optical resonator with respect to a spacing between the first and second optical cavities caused by a motion which may be caused by, e.g., acceleration of an object. The detected change in the optical resonance or optical field of one of the two optical cavities is then used to measure the motion or acceleration.

Figure 1B:
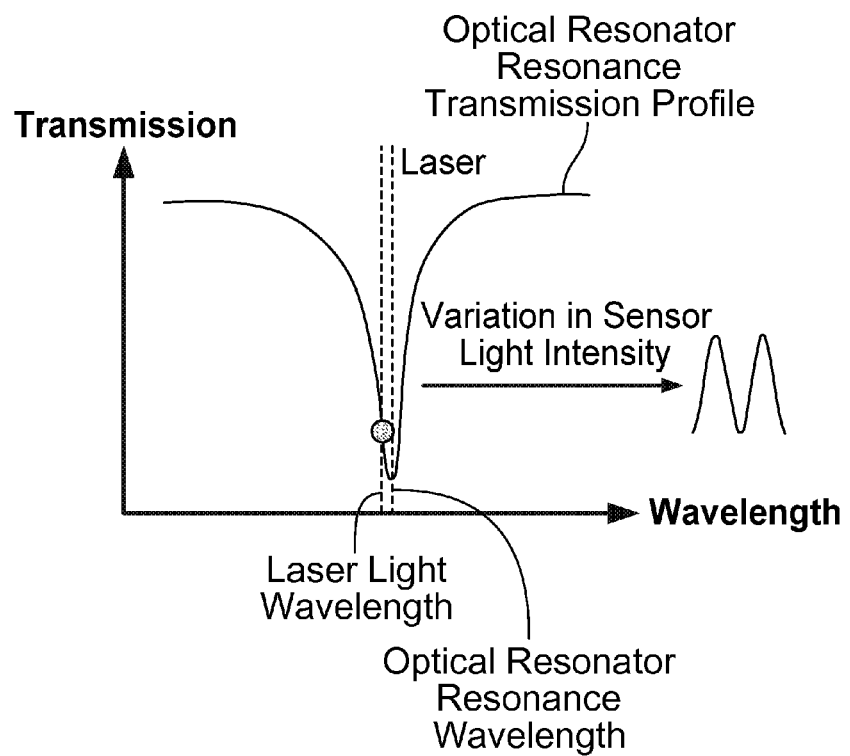

FIGS. 1A and 1B show the structure and optical sensing of an exemplary optomechanical device capable of measuring motion (e.g., including acceleration) based on the above method. Due to the opto-mechanical nature of the sensing operation, this device can be referred to as a cavity optomechanical accelerometer (COMA). As shown in FIG. 1A, a substrate 101 is provided as a platform to support the two optical resonators and is used to form a first optical cavity 102 which is fixed onto the substrate 101. The substrate 101 can be made of a suitable material such as silicon and others. A second optical cavity 103 is separated from the first optical cavity 102 by a distance that is sufficiently small to provide optical coupling between first and second optical cavities 102 and 103 to form a composite optical resonator that exhibits an optical resonance. This coupling between the cavities 102 and 103 can be optical evanescent coupling. The optical resonance of the composite optical resonator varies with the spacing between the first and second optical cavities 102 and 103, which can be caused by a relative motion of the second optical cavity 103 relative to the first optical cavity 102 or deformation of the second optical cavity 103. A suspension 104 is coupled between the first and second optical cavities 102 and 103 to allow the second optical cavity 103 to move or deform with respect to the first optical cavity 102 under action of a force to change a spacing between first and second optical cavities 102 and 103. For example, this suspension 104 can be implemented by a spring or other structures with a resilient property. An optical coupler 105 is provided and couples light into the composite optical resonator formed by the first and second optical cavities 102 and 103. For example, a light source, e.g., such as a laser, can be used to produce the light that is coupled into the device via the optical coupler 105. In FIG. 1A, the optical coupler 105 is illustrated for two coupling operations: coupling light from the light source into either one or both of the optical resonators 102 and 103 and coupling the sensor light out of one or both of the optical resonators 102 and 103 for detection of the change in the sensor light that is caused by the relative motion between the two resonators 102 and 103. In some implementations, the laser may also be directly integrated on the sensor substrate, removing the need for providing a designated optical coupling mechanism for routing the laser light from an off-chip laser onto the sensor substrate. This integration of the laser to the sensor substrate enables a compact sensor device configuration that is desirable for various applications.

In FIG. 1A, a detection unit 106 is provided to use an optical detector to detect a change in the optical resonance with respect to the spacing between first and second optical cavities 102 and 103. The change in the optical resonance in either one of the two coupled optical resonators 102 and 103 can cause an intensity or power variation of the confined light in the optical resonator 102 or 103 and this variation is reflected in the sensor light captured by the optical detector. A detection processing circuit is provided, as either a part of the detection unit 106 or another unit connected to the detection unit 106, to process the change in the detected sensor light to measure the spacing and the associated acceleration based on the detected change. In the example in FIG. 1A, this detection unit 106 is integrated on the substrate 101 to form an integrated sensor device. Further device integration may include integration of the laser on the same substrate that supports the two optical resonators. In other implementations, this detection unit 106 may be off the substrate 101.

FIG. 1B shows the optical transmission spectral profile of one of the two coupled optical resonators 102 and 103 from which the optical coupler 105 couples the sensor light out as in form of an optical transmission signal of that optical resonator to illustration the optical sensing in the optomechanical sensor device in FIG. 1A. The laser used for the device in FIG. 1A is tuned off the resonator resonance peak. When the spacing between the two resonators 102 and 103 changes, the shift in the resonator resonance peak due the spacing change causes the optical transmission of the resonator to change. This change in the optical resonator transmission produces a variation in the sensor light intensity received by the optical detector in the detection module 106.

The two coupled optical resonators 102 and 103 may be identical to each other in some implementations and, in other implementations, may be different from each other. In various applications, it may be convenient to have the two optical resonators 102 and 103 as identical resonators for easy of fabrication or device assembly. Certain sensors based on the design in FIG. 1A may be specifically designed to use two optical resonators with different resonator constructions, geometries, or dimensions to achieve certain desired features.

From the mechanical design point of view, the movable second optical resonator 103 effectuates a movable proof mass in a mechanical oscillator formed by the two optical resonators 102 and 103 with the suspension 104. Depending on the design of the suspension 104 that mechanically suspends the movable second optical resonator 103 and as part of the mechanical considerations of the mechanical oscillator, the mass of the movable proof mass provided by the movable second optical resonator 103 can be designed to be sufficiently large to improve the mechanical noise performance of the mechanical oscillator. One way for increasing the effective proof mass of the movable second optical resonator 103 is to attach an additional mass to the movable second optical resonator 103 or mechanically engage another movable structure with a large proof mass to the movable second optical resonator 103.

The detection sensitivity of the optomechanical device design in FIG. 1A can be measured by an optomechanical coupling parameter as the figure of merit:

$$g_{om} = \frac{d\omega_o}{dz}$$

where $\omega_0$ represents the optical resonance frequency of one of the optical resonators 102 and 103 from which the sensor light is obtained and measured and z represents the spacing between the two optical resonators 102 and 103. Hence, the above parameter is a ratio of the change in the optical resonance frequency ($d\omega_0$) over the change in the spacing (dz). The two optical resonators 102 and 103 and the mechanical designs of the two optical resonators 102 and 103 and the suspension 104 can be designed to increase the sensor sensitivity by increasing the above ratio. The above mentioned use of a sufficiently large effective proof mass is part of the considerations to increase the sensor sensitivity and to increase the signal to noise ratio of the sensor in FIG. 1A.

Figure 2A:
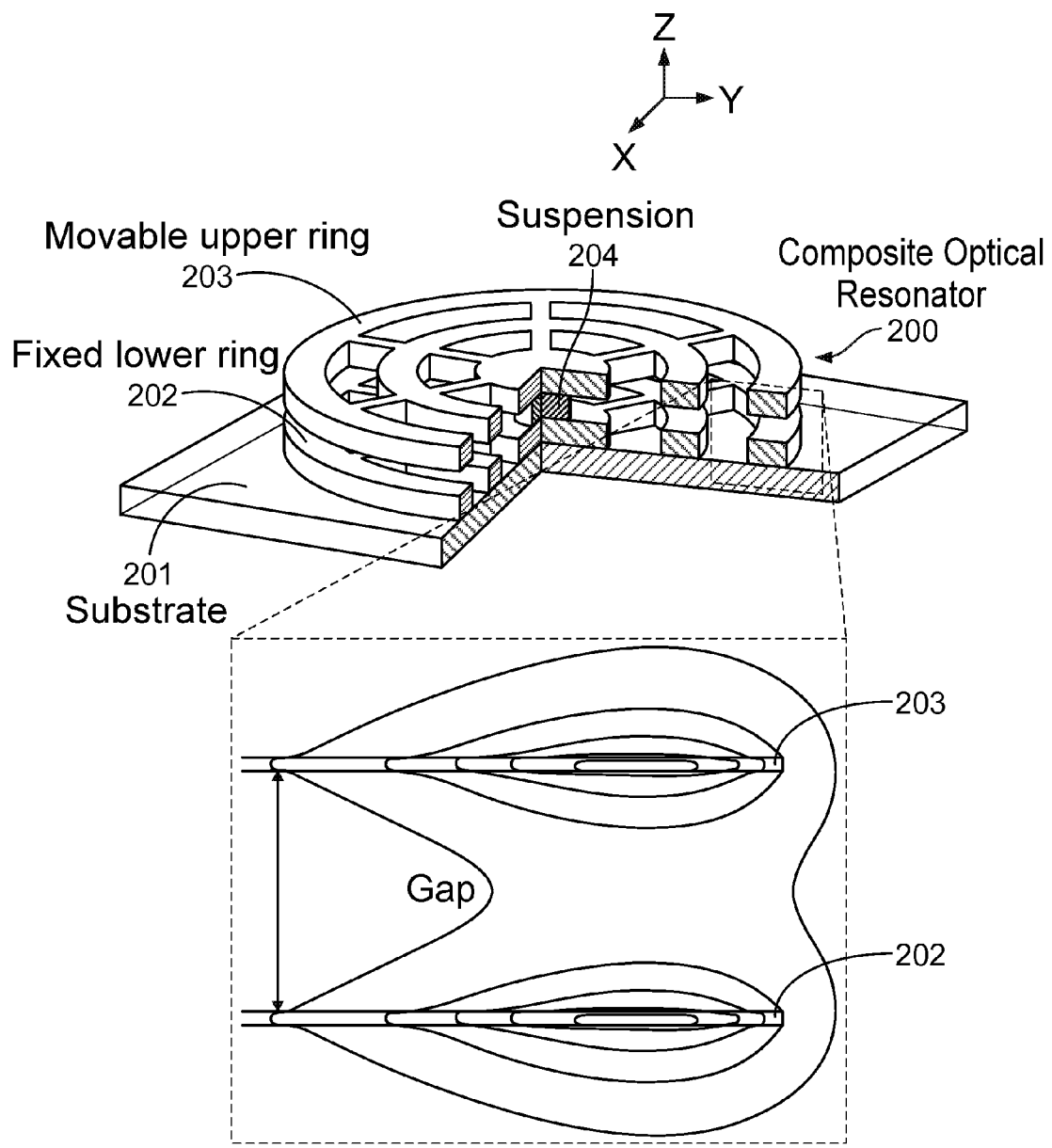
FIG. 2A shows a schematic of an exemplary composite resonator having a suspended upper ring resonator and a fixed lower ring resonator for an optomechanical sensor device.

FIG. 2A shows a schematic of an exemplary composite optical resonator 200 as one of the possible implementations of the design in FIG. 1A. The exemplary composite optical resonator 200 can be configured as two stacked optical ring resonators 202 and 203 over a substrate 201. The two stacked optical ring resonators 202 and 203 are a fixed lower ring resonator 202 fixed to the substrate 201 and an upper ring resonator 203 that is suspended above the lower ring resonator 202 via a suspension 204 (e.g., such as a spring mechanism) so that the upper ring resonator 203 is movable under the mechanical constraint of the suspension 204 relative to the lower ring resonator 202 fixed on the substrate 201. In general, the upper ring resonator 203 can move along X, Y or Z directions relative to the lower ring resonator 202. In some implementations, the suspension 204 for engaging the movable upper ring resonator 203 and the fixed lower ring resonator 202 may be configured to favor a motion along a selected direction.

For example, in the example in FIG. 2A, the suspension 204 can be a spring that compresses or stretches along the Z-direction to confine the movement of the movable upper ring resonator 203 primarily along the Z direction. As such, the device in FIG. 2A is operated as a Z-axis accelerometer device which uses guided light to sense proof mass displacement that corresponds to the acceleration of the device in the z-axis direction perpendicular to the plane of the substrate 201. In operation, as the upper ring resonator 203 moves due to z-axis acceleration, the inter-resonator optical coupling between the two ring resonators 202 and 203 changes with the spacing between the two ring resonators 202 and 203. This change in the inter-resonator optical coupling between the two ring resonators 202 and 203 causes a change in the resonant frequency of the optical mode (which may be caused by a change in the effective refractive index or the optical path length experienced by the mode). The optical transmission changes with the spacing variation due to the acceleration when the laser is biased on the side of the optical resonance as illustrated in FIG. 1B. The two coupled optical ring resonators 202 and 203 are two outer rings of two wheels with spokes in the example shown in FIGS. 2A and 2B. Each spoke wheel includes a hub, an additional ring with a smaller radius and spokes along the radial directions—such additional rings may not always be necessary but may provide mechanical rigidity of and support to the spoked wheel. These structural elements are not part of optically functional structures of the two coupled optical ring resonators 202 and 204. The two ring resonators 202 and 203 may be made of silicon based materials, e.g., silicon nitride. The ring resonators 202 and 203 may be configured to have radius of 100 μm, with ring and spoke widths of 8 μm, and a thickness of 220 nm, in which the gap at the rim after release is 2.5 μm. Exemplary implementations of the exemplary z-axis accelerometer device were performed that demonstrated a sensitivity of 22 percent-per-g optical modulation.

In other implementations, the two optical cavities 201 and 202 shown in FIG. 2A can be nano photonic rings stacked vertically to form the composite resonator, which may be a whispering gallery mode optical resonator. For example, the device shown in FIG. 2A can measure acceleration or other forces (e.g., Coriolis force from a gyroscope measurement) based on changes in the spacing or gap between the two optical resonator rings 202 and 203 which leads to a change in the optical resonance of the composite resonator 200, e.g., in which the optical transmission of the device is then changed. This allows for sensing of motion, such as acceleration.

Figure 2B:
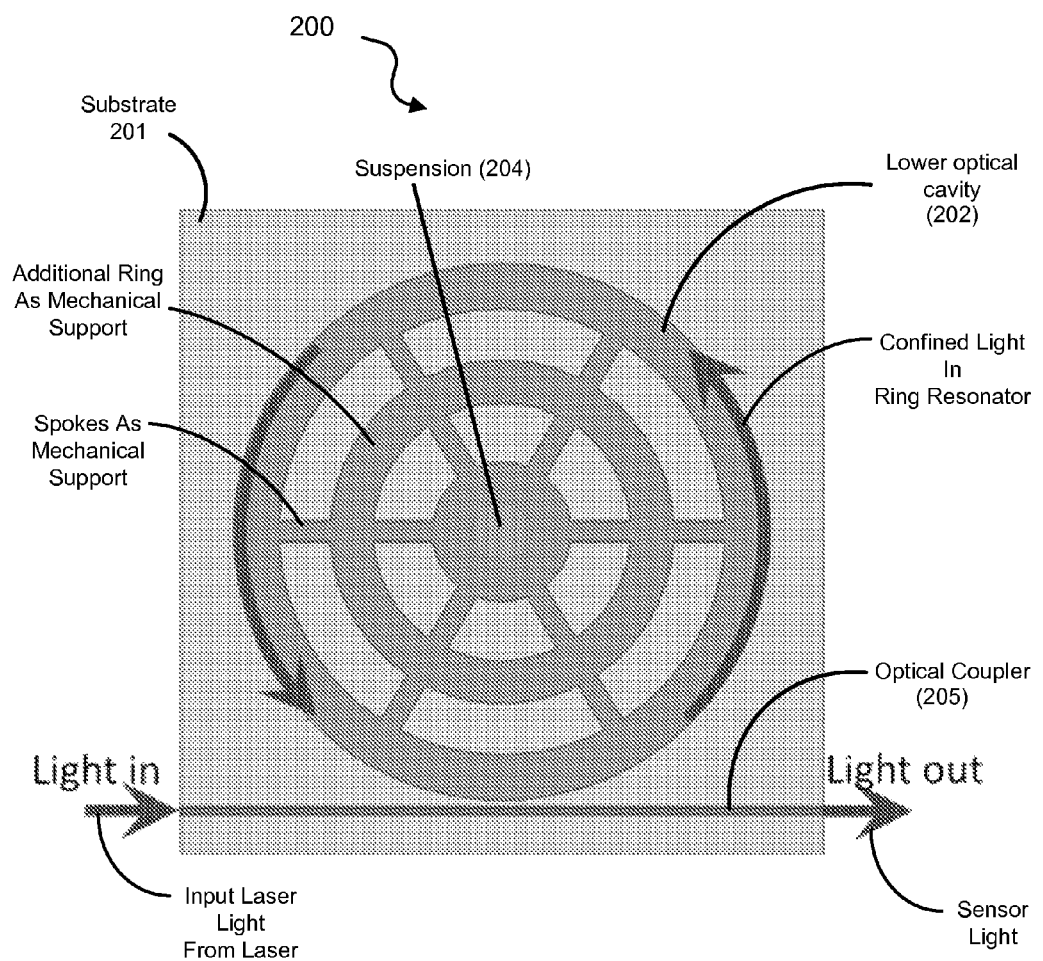
FIG. 2B shows a top view of the schematic of the optical resonator and optical coupler.

FIG. 2B shows a cross sectional view of the two coupled optical ring resonators 202 and 204 along with an optical waveguide coupler 205 formed on the substrate 201. The lower ring resonator 202 is fixed to the substrate 201 at a location adjacent to the optical waveguide coupler 205 so that the coupler 205 can couple input light from the laser into the lower ring resonator 202, via evanescent coupling, to provide optical energy to the two coupled optical ring resonators 202 and 204. The waveguide coupler 205 can be implemented by an optical waveguide integrated on the substrate 201 or an optical fiber.

In the exemplary configuration in FIGS. 2A and 2B, the spoked wheel for the upper ring resonator 203 is mechanically anchored in the center to the lower ring resonator 202 and the substrate 201 via the suspension 204. The rim of the upper ring resonator 203 is free to move. The lower ring resonator 202 is fixed to the substrate 201 and cannot move. In some implementations, the upper ring resonator 203 can be configured to have a small proof mass small (e.g., total mass of the upper ring being 8.7 ng) and a large mass can be attached to the upper ring resonator 203, e.g., by a back-side through-wafer etch of the underlying substrate.

In the example in FIGS. 2A and 2B, the two ring resonators 202 and 203 are identical in geometry, shape and dimension. The inset cutout of FIG. 2A shows a contour plot of the electric field intensity of an exemplary fundamental optical supermode supported by the two ring resonators 202 and 203 spaced by 2.5 microns where the contour scale is linear, and the thickness and gap between the two resonators 202 and 203 are drawn to scale. This fundamental supermode is a result of superposition of the fundamental TE modes of the two resonators 202 and 203 where the mode in one resonator is modified by the presence of the other resonator.

Figure 2C:
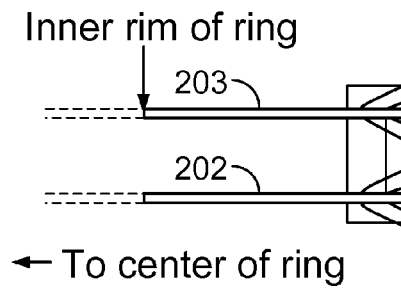
FIG. 2C shows various optical modes in the two coupled optical ring resonators in FIG. 2A.
Figure 2C:
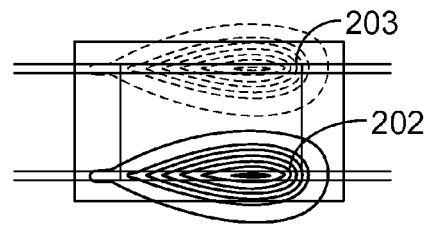
Figure 2C:
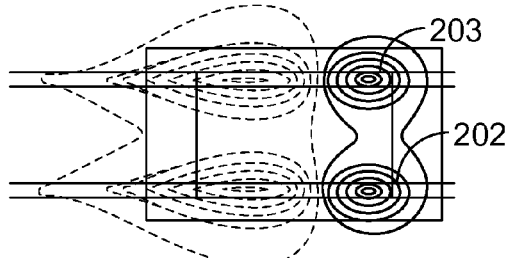
Figure 2C:
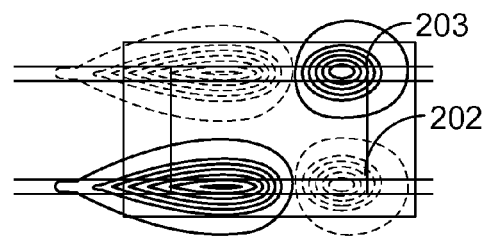
Figure 2D:
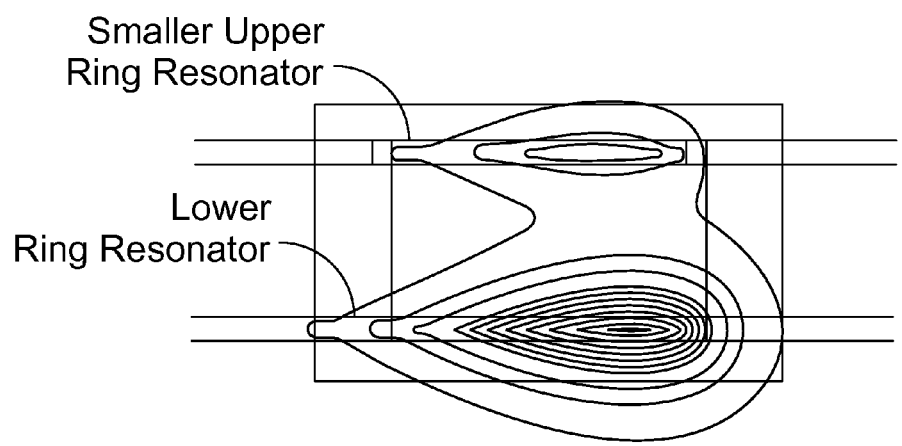
FIG. 2D shows the mode distribution of two coupled optical resonators with different resonator sizes an example of using two non-identical optical resonators for optomechanical sensing.

FIG. 2C shows mode profiles for several TE modes for the two identical ring resonators 202 and 203, including the details of the fundamental supermode whose energy is largely distributed at the outer rim of the two identical ring resonators 202 and 203. In implementations, various optical modes of the two resonators 202 and 203 can be used to provide the optical coupling between the two resonators. Exemplary modes from the two resonators 202 and 203 are shown in each diagram in FIG. 2C. In practice, if the two resonators 202 and 203 are slightly different, the mode may be asymmetric in its spatial distribution at the two resonators as shown in FIG. 2D, but the sensing principle remains the same. Suitable modes for providing inter-resonator coupling tend to be the fundamental or lower-order modes due to their long evanescent tails. In general, an optical mode of one of the two resonators 202 and 203 can be used if its mode shape can be modified by the presence of the other resonator.

In various implementations, two different optical resonators can be used to provide the inter-resonator coupling for optomechanical sensing as in the device with two identical resonators in FIG. 2A. Two different optical resonators can be different in various ways, including, e.g., a difference in the resonator size and dimension or different refractive indices of the resonator materials. FIG. 2D shows an example of an optomechanical sensor having two optically coupled ring resonators of different sizes for optomechanical sensing where the upper ring resonator has a smaller diameter than the lower ring by a specified amount (e.g., 0.5 micron). This difference in size creates a difference in the spatial distribution of the mode at the two resonators. In most designs, a small spacing between the two coupled optical resonators is desirable to provide a strong optical coupling between the two resonators and thus a sensitive response to a change in the spacing. For a sensor with two different optical resonators, a smaller spacing tends to reduce the impact to the device operation caused by the difference in the two coupled optical resonators.

Various optical cavities can be used, including nonring cavities such as photonic crystal cavities and other cavities. Optical whispering gallery mode cavities in various configurations may be used as the two cavities of FIG. 1. Gyroscopes and other devices can be constructed based on the design in FIG. 1.

Figure 3:
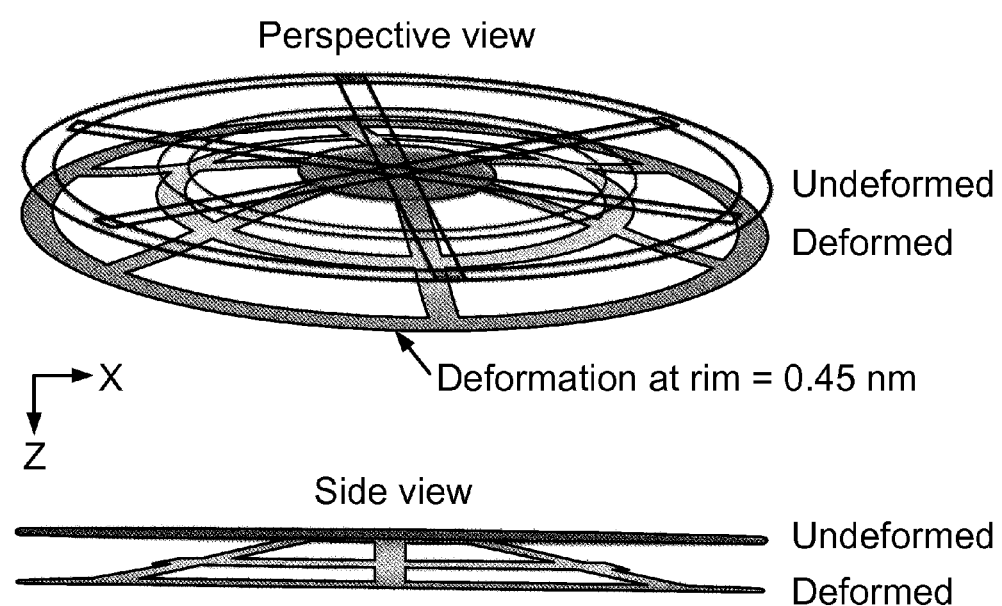
FIG. 3 shows a plot of finite-element simulations of an exemplary optomechanical sensor device having two identical optical ring resonators where lower diagram shows mechanical deformation of the movable top ring resonator while the lower ring resonator is fixed to the supporting substrate.

FIG. 3 shows a plot demonstrating finite-element simulations of the device in FIG. 2A showing expected deformation of the upper ring resonator 203 due to gravity. Only the upper released and moveable ring is shown in an undeformed state (e.g., shown as the black wireframe) and a deformed state (e.g., shown as the colored surface). The upper ring optical resonator 203 is configured with a 100 μm radius and 220 nm thickness, and formed of silicon nitride. The plot shows that that under 1 g of acceleration, the upper ring resonator deforms by approximately D=0.45 nm/g at the rim. The mechanical resonant frequency of this structure was also found using exemplary finite-element simulations to be $\omega_m$=65 kHz.

Exemplary simulations of the optical mode are described to show how the optical resonant frequency can be affected by deformation of the upper ring. The optical mode of the stacked rings was modeled using finite element software to extract the optical eigenfrequencies $\omega_0$ versus ring-ring gap z for the fundamental optical mode.

Figure 4:
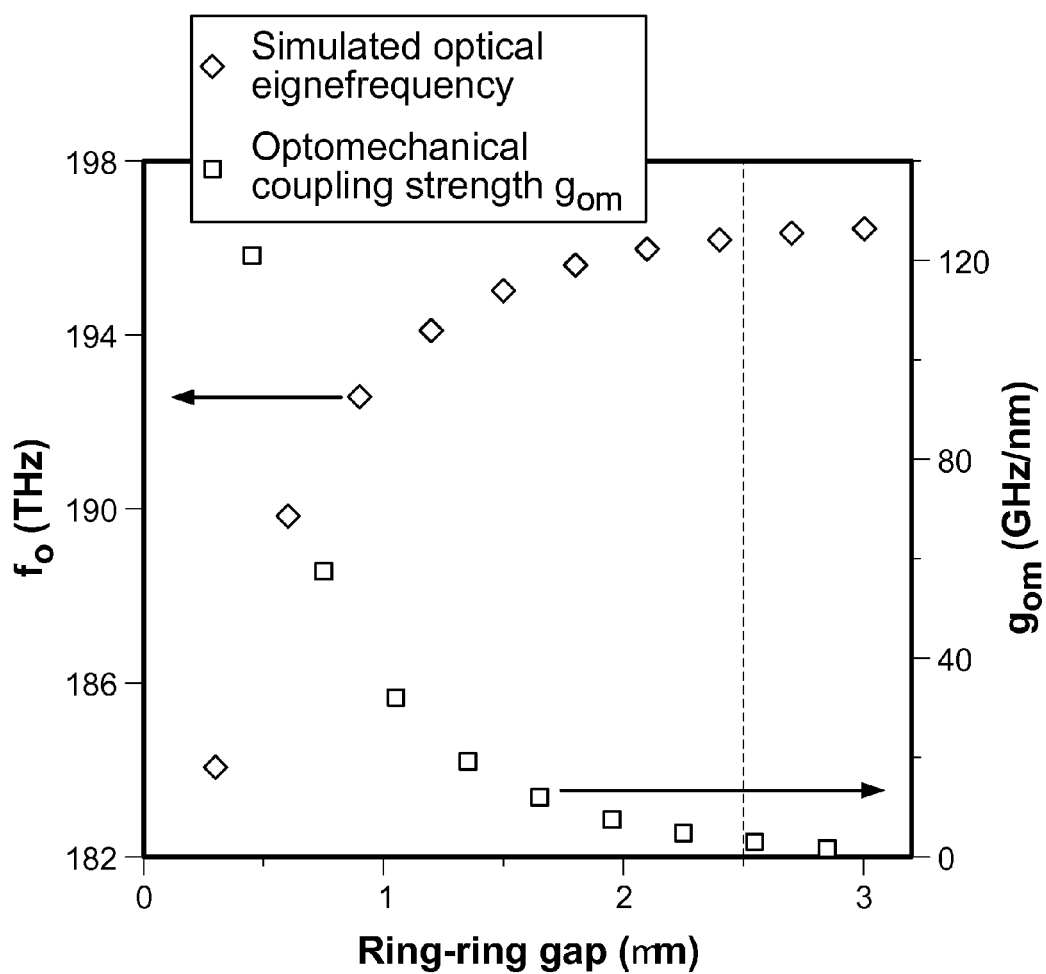
FIG. 4 shows a plot of the simulated optical eigenfrequency and optomechanical coupling strength $g_{om}$ for stacked rings separated by different gaps, wherein the coupling strength $g_{om}$ is a derivative of the resonant frequency with respect to the spacing z: $g_{om}=d\omega_0/dz$.

FIG. 4 shows a plot of the simulated optical eigenfrequency (e.g., represented as blue diamonds) and optomechanical coupling strength $g_{om}$ (e.g., represented as red squares) for stacked rings separated by different gaps. The green dashed line indicates the measured gap for the exemplary composite optical resonator 200. For the gap of the exemplary composite optical resonator 200, $$\frac{g_{om}}{2\pi} \approx 4 \text{ GHz/nm}.$$

Implementations of the exemplary COMA device were performed to demonstrate the sensitivity of the composite optical resonator 200 to acceleration. For example, knowing $g_{om}$, the expected shift in optical resonance wavelength $\lambda_o$, due to small movements $\Delta z$ of the upper ring can be determined. This can be represented by:

$$\Delta\lambda_o \approx c\Delta f/f^2 = c\left(\frac{g_{om}}{2\pi}\Delta z\right)/\left(\frac{c^2}{\lambda_0^2}\right) = \frac{g_{om}\Delta z \lambda_0^2}{2\pi c} \quad (1)$$

Simulations indicate that an acceleration change of 2 g (+g to −g) can cause a deflection of $\Delta z$=0.45 nm×2=0.90 nm at the rim. Using $g_{om}$=4 GHz/nm and $\lambda_0$=1532.5 nm, the optical resonant wavelength is shown to increase by 4.5 pm under a −g to +g acceleration change (e.g., achieved by flipping the exemplary COMA device).

The sensitivity of the exemplary COMA device is demonstrated when the laser is placed at the point of steepest slope of the optical resonance. The transmitted power as a function of frequency ω is $$P(\omega) = P_0 \left[\frac{4(\omega-\omega_0)^2 + \omega_0^2\left(\frac{1}{Q_{int}} - \frac{1}{Q_{coup}}\right)^2}{4(\omega-\omega_0)^2 + \omega_0^2\left(\frac{1}{Q_{int}} + \frac{1}{Q_{coup}}\right)^2}\right] \quad (2)$$

where $P_0$ is the input power, $\omega_0$ is the ring cavity optical resonant frequency, and $Q_{int}$ and $Q_{coup}$ are the intrinsic optical quality factor and the coupling contribution, respectively. For critical coupling between the two cavities, $Q_{int}=Q_{coup}$, so that the total optical quality factor $Q_0$ of the composite resonator is $$\frac{1}{Q_0} = \frac{1}{Q_{int}} + \frac{1}{Q_{coup}} = \frac{\Delta\omega_{FWHM}}{\omega_0} = \frac{\Delta\lambda_{FWHM}}{\lambda_0} \quad (3)$$

The slope of the Lorentzian is greatest at an offset of $$\frac{1}{\sqrt{3}}$$

times HWHM $$\left.\frac{dP(\omega)}{d\omega}\right|_{\omega=\omega_0\pm\frac{1}{\sqrt{3}}\frac{\omega_0}{2Q_0}} = \frac{196\sqrt{3}}{2401}\frac{Q_0}{\omega_0}P_0 \equiv \xi\frac{Q_0}{\omega_0}P_0 \quad (4)$$

Therefore, the following can be derived for acceleration a and vertical mechanical displacement x of the top ring from the bottom ring:

$$\frac{dP}{da} = \xi\frac{Q_0}{\omega_0}P_0\frac{d\omega}{dx}\frac{dx}{da} \quad (5a)$$

$$\frac{d(P/P_0)}{da} = \xi\frac{Q_0}{\omega_0}g_{OM}D \quad (5b)$$

For the following:

$$\frac{g_{OM}}{2\pi} = \frac{1}{2\pi}\frac{d\omega}{dx} = 3.8 \text{ GHz/nm}$$

(from COMSOL parametric simulation for the measured gap), $$D = \frac{dx}{da} = 2\times 10^{-4} \text{ μm/g}$$

(from COMSOL static deformation simulation), $Q_0$=66 000 (measured), $\omega_0$=c/(1532.5 nm), and $n_{\it eff}$=1.7 (estimated, but can be found using COMSOL), and assuming a perfect detector, the following can be derived:

$$\frac{d(P/P_0)}{da} = \frac{23\%}{g} \quad (6)$$

Figure 5A:
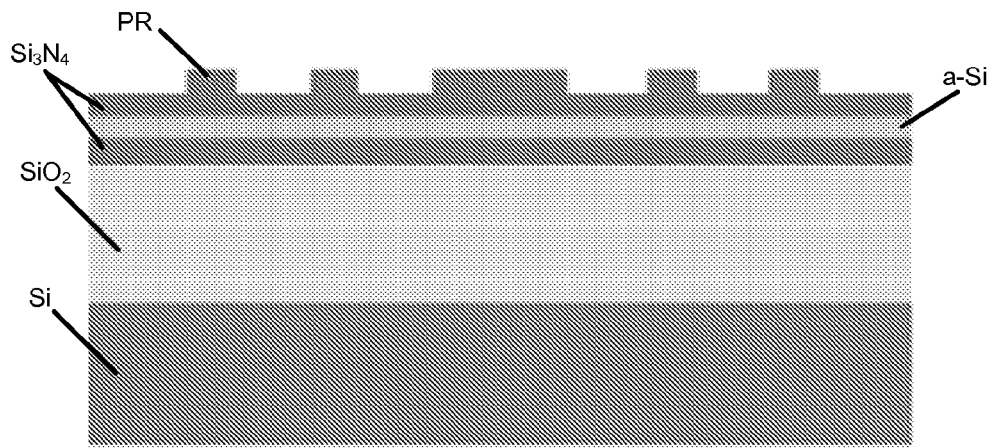
FIG. 5 shows an exemplary fabrication process of an exemplary optomechanical sensor device having two optically coupled disk optical cavities.
Figure 5B:
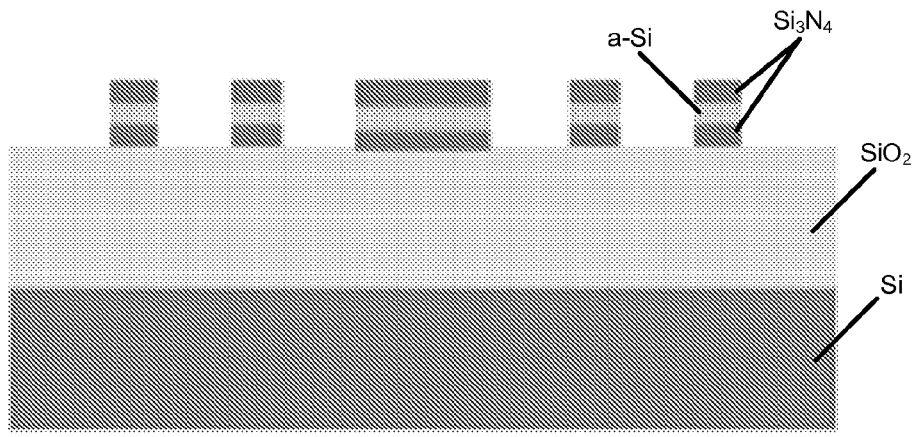
Figure 5C:
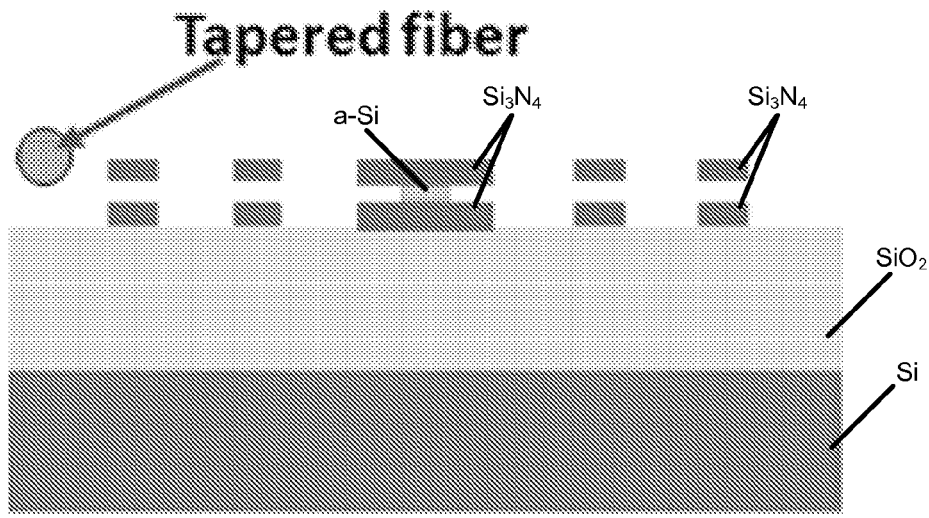

FIGS. 5A, 5B and 5C show an example of a fabrication process to fabricate a two-resonator optomechanical sensor on a substrate. The exemplary COMA can be fabricated by growing a low index dielectric layer (e.g., a 4 μm oxide layer) on the substrate which is Si in this example, then depositing 220, 180, 220 nm of $Si_3N_4$ which has a refractive index higher than the low index dielectric layer amorphous Si as the inter-resonator layer, $Si_3N_4$ respectively using LPCVD. In various implementations, a dielectric layer with a refractive index lower than that of the material for forming the two optical resonators is formed directly on top of the substrate as the base for forming the two optical resonators. This low index layer provides a material support layer for the layers for the optical resonators and also functions as an optical isolation layer for providing good optical confinement of light in the optical resonators. In the example in FIG. 5A, this low index layer on the Si substrate is silicon dioxide and the material for the optical resonators is silicon nitride which has a refractive index higher than silicon oxide. A patterned photoresist (PR) layer is formed on the top for the subsequent etching process. For example, the spoked wheel shape can be etched through a nitride:a-Si:nitride stack by RIE. In this example, a 100 micron radius spoked wheel shape is etched through the three top layers with RIE (e.g., $CHF_3/O_2$ chemistry) and the a-Si sacrificial layer is removed by $XeF_2$ to release the upper ring. For example, the underlying 4 μm oxide can provide optical isolation. The a-Si layer can then be etched in $XeF_2$. For example, the upwards curling of the upper layer after release prevents the upper layer from sticking to the lower nitride layer during $XeF_2$ release. After release, the spokes curl upwards due to stress, resulting in a final ring-ring gap which is larger than the original 180 nm. For example, the exemplary fabricated COMA device includes a gap of about 2.5 μm. The fabricated device can be interrogated using a tapered optical fiber. As was shown in FIG. 4, smaller gaps may be preferable; however even with a large gap, acceleration sensitivity of the COMA device is sufficient.

Figure 6:
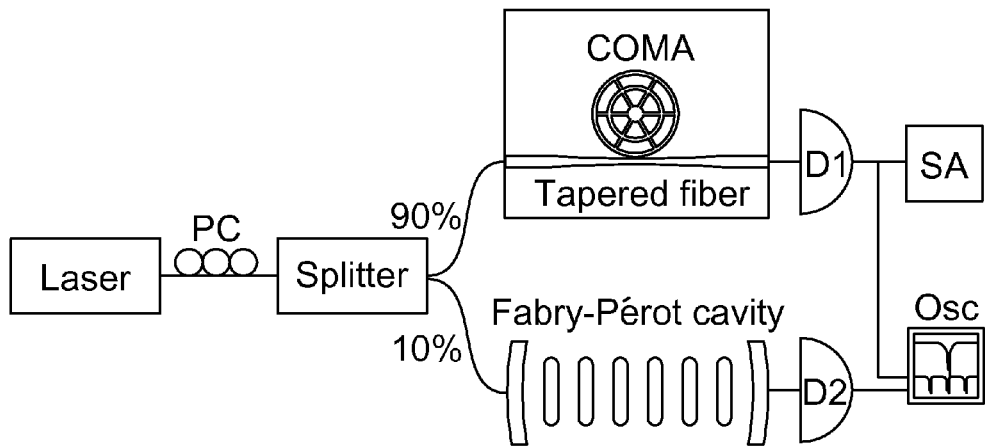
FIG. 6 shows a schematic of a testing setup configuration of an exemplary optomechanical sensor device and a fixed-length Fabry-Perot optical cavity.

FIG. 6 shows an exemplary testing setup configuration to measure the spectral response of the COMA device via swept-wavelength measurement by using a fixed-length Fabry-Perot optical cavity as a reference. For the swept-wavelength measurements, the wavelength of the laser light was swept and the light was passed through a polarization controller (PC) and then split into two beams for passing through the COMA device and the Fabry-Perot reference resonator. Detectors D1 and D2 were used to record the optical transmission spectra of the COMA device and the Fabry-Perot reference cavity, which were monitored on an oscilloscope (Osc). For the mechanical spectrum measurements, the wavelength was fixed and D1 was monitored on a spectrum analyzer (SA). For the swept-wavelength measurements, the laser (New Focus Velocity 6328) wavelength was swept continuously up and down, and the light was passed through a polarization controller and then split. One part was evanescently coupled from a tapered optical fiber into the COMA and the transmitted light monitored on detector D1. The other part was passed through a fixed-length Fabry-Pérot cavity (Thorlabs SA210-12B) which provided fixed reference wavelengths to remove sweep-to-sweep drift of the laser (done during post-processing of data) and was monitored on detector D2 (e.g., using Thorlabs SA210-12B) and an oscilloscope. For the mechanical spectrum measurements, the wavelength was fixed and a spectrum analyzer detected the optical modulation at D1. All light was contained in fiber optics except for the Fabry-Perot cavity arm.

Figure 7:
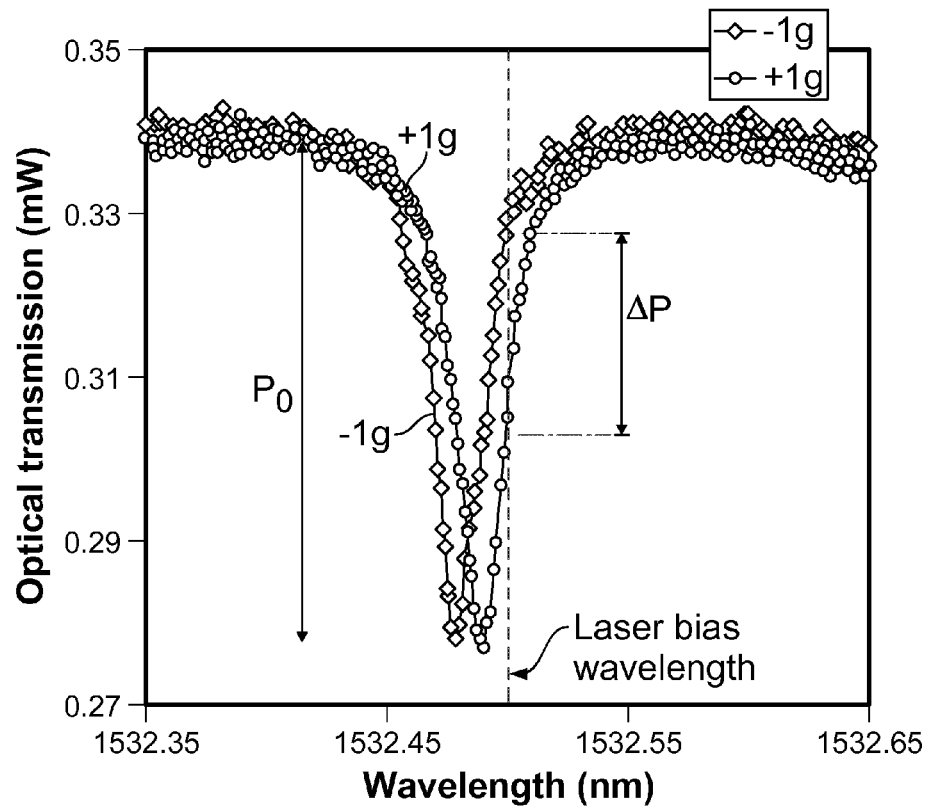
FIG. 7 shows a plot of the optical transmission spectrum of an exemplary optomechanical sensor device.

FIG. 7 shows a plot of the optical transmission spectrum of the device as a function of wavelength for +g (red circles) and −g (blue diamonds) configurations. The half-maximum of one resonance is demonstrated to lie at approximately the minimum of the other resonance, demonstrating large optical transmission change with only a few g's of force. The optical mode was shown to have a quality factor of $Q_0$=66,000; FWHM was shown to be 23 pm; and the peak shifted by 10 pm under 2 g acceleration. The +g (chip face up) resonance is at longer wavelengths than the −g (chip face down) measurement, e.g., because a smaller gap leads to a lower optical eigenfrequency, as was shown in FIG. 4, which corresponds to a longer resonant wavelength Using Eq. 5b and $g_{om}$ and D from finite element analysis, the theoretical wavelength shift was determined to be 4.5 pm and the sensitivity to acceleration for the mode shown here is 14 percent-per-g. This sensitivity value means that with the laser on the optical resonance at the point of steepest slope, for small accelerations, the light changes by 14% of its maximum to its minimum value. The observed shift is larger, at around 10 pm. For example, any discrepancy in the measured resonant frequency shift may be due to the initial gap measurement uncertainty and a spring stiffening effect caused by up-curl after release of the upper ring due to stress.

Figure 8:
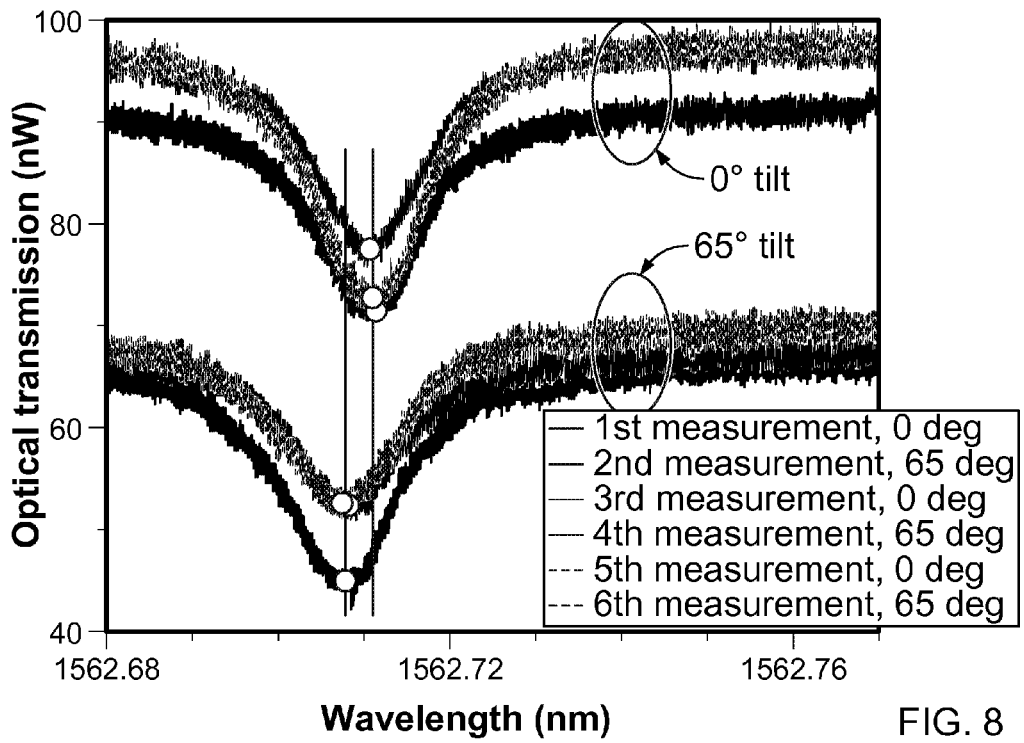
FIG. 8 shows a plot of arbitrary angle repeatability measurements.

In another implementation, the exemplary COMA device was placed on a tilt stage to test the resonant shifts for repeatability. FIG. 8 shows a plot showing the arbitrary angle repeatability measurements. In this exemplary implementation, the exemplary COMA device was measured at 0°, then 65°, then 0° tilt, etc., repeatedly. It is noted, for example, that each time the taper would have been in a slightly different position, and so a different amount of light was coupled in. Nevertheless a definite resonance shift is apparent, as shown in FIG. 8, demonstrating that the measured resonance shift is not due to differences in coupling strength from implementation to implementation. In FIG. 8, the vertical black lines and blue dots are overlaid to indicate the frequency shift. While the resonant frequency does vary slightly even among measurements at the same tilt, these discrepancies can be associated with differences in the coupling position of the tapered fiber, which may be mitigated by utilizing an integrated waveguide.

Figure 9:
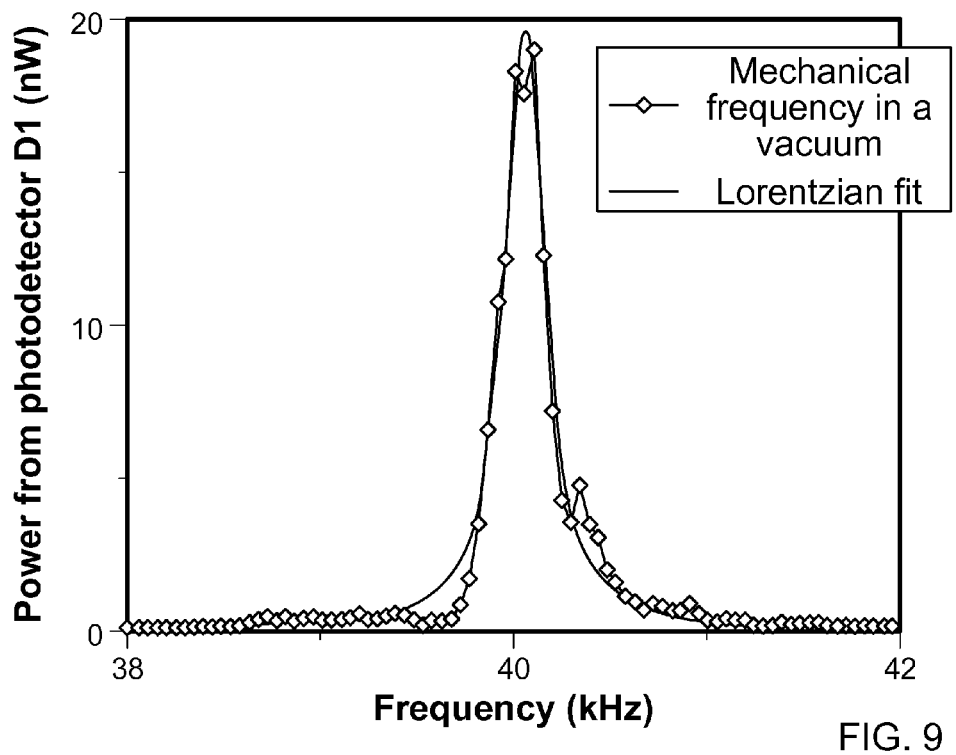
FIG. 9 shows a plot of the mechanical frequency of an exemplary optomechanical sensor device in a vacuum and a Lorentzian fit curve.

FIG. 9 shows a plot of the mechanical frequency of the COMA device in vacuum (blue diamonds) and Lorentzian fit (red curve). The taper was touching the upper ring in these vacuum measurements, damping the mechanical motion. For example, the power spectral density of the device were measured in a vacuum to get an estimate of the bandwidth and noise floor of the COMA. The mechanical spectrum of an exemplary COMA device with four spokes (e.g., rather than six) was measured in vacuum (40 µTorr), shown in FIG. 9. In this exemplary implementation, the taper was actually touching the device, and therefore the mechanical signal was shown to be small since the optical mode was degraded and broad ($Q_m=160$) since the taper damps the ring's mechanical motion, e.g., which can be due to limitations with fine-positioning of the taper in the vacuum chamber.

Figure 10:
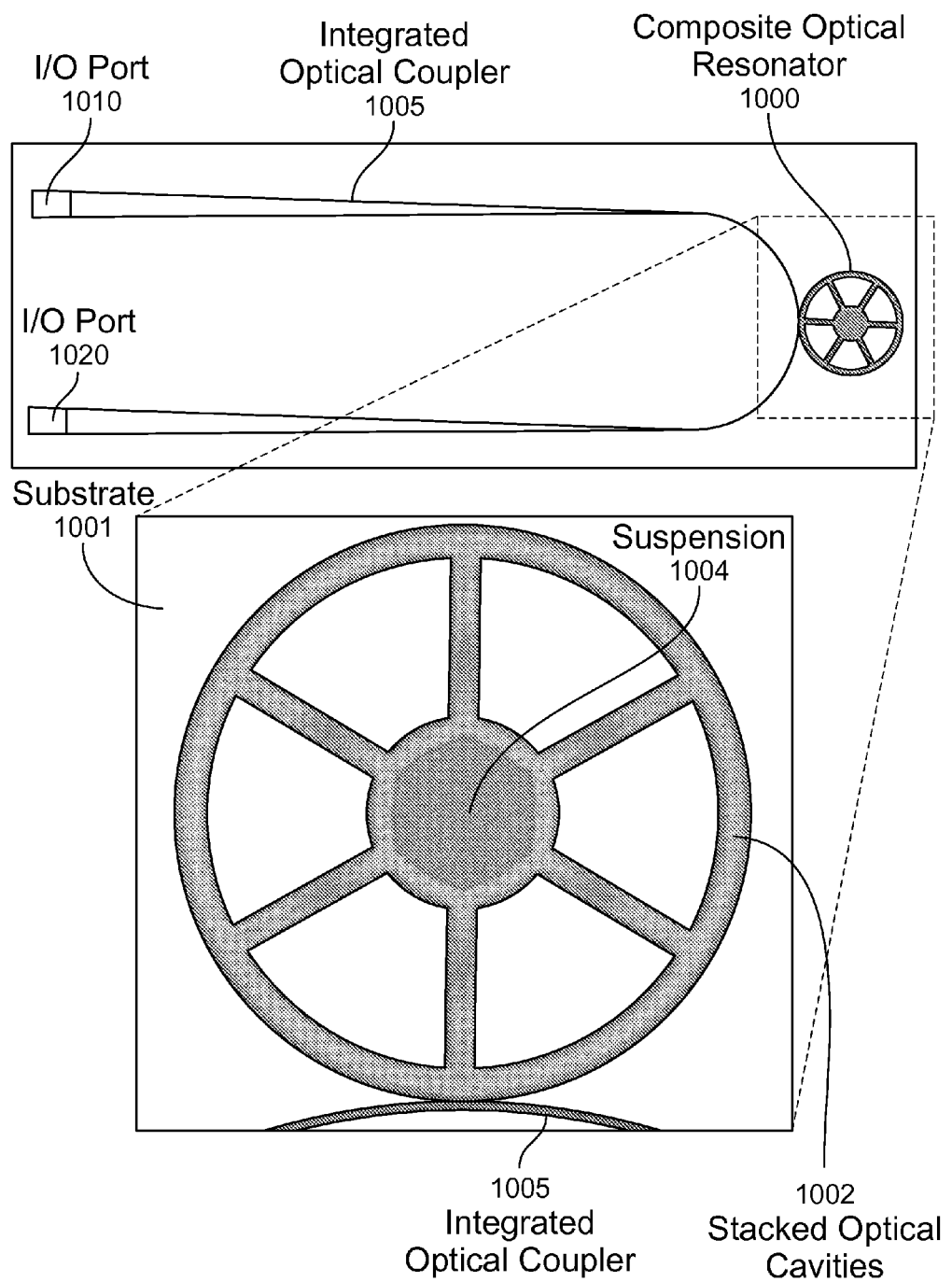
FIG. 10 shows a schematic of an exemplary optomechanical sensor based on two optically coupled optical resonators with an integrated optical coupler.

FIG. 10 shows a schematic of an exemplary optomechanical sensor that includes a composite optical resonator 1000 with two coupled ring resonators and an integrated optical coupler 1005. For example, the composite optical resonator 1000 and the integrated optical coupler 1005 are fabricated on the same substrate (e.g., Si-based chip) where the integrated optical coupler 1005 is a waveguide coupler with two terminal ports 1010 and 1020 as the I/O ports for receiving input laser light and exporting output sensor light. The I/O ports 1010 and 1020 can be made in various configurations, including grating ports.

FIG. 10 includes an inset of the composite optical resonator 1000 showing the stacked optical cavities 1002 (e.g., including a lower ring resonator fixed to a substrate 1001 below an upper ring resonator coupled to and is free to move with respect to the lower ring resonator via a suspension 1004 configured at the center of the ring structure of the stacked optical cavities 1002). The inset also shows the integrated optical coupler 1005, e.g., such as a waveguide, is positioned substantially next to the stacked optical cavities 1002 to couple light into the composite optical resonator 1000. Light is evanescently coupled into the rings of the composite optical resonator 1000 by the integrated optical coupler 1005, in which the light circulates around their outermost rims. The ring resonators are configured close enough that there is optical coupling between them and they support gap-sensitive optical supermodes. Only optical wavelengths that fit an integer number of times around the circumference are supported in the stacked-ring composite optical resonator 1000, and other wavelengths pass by. Motion causes the ring-ring gap to change, changing the optical resonance frequency, which is measured as optical intensity variation at the output.

Figure 11:
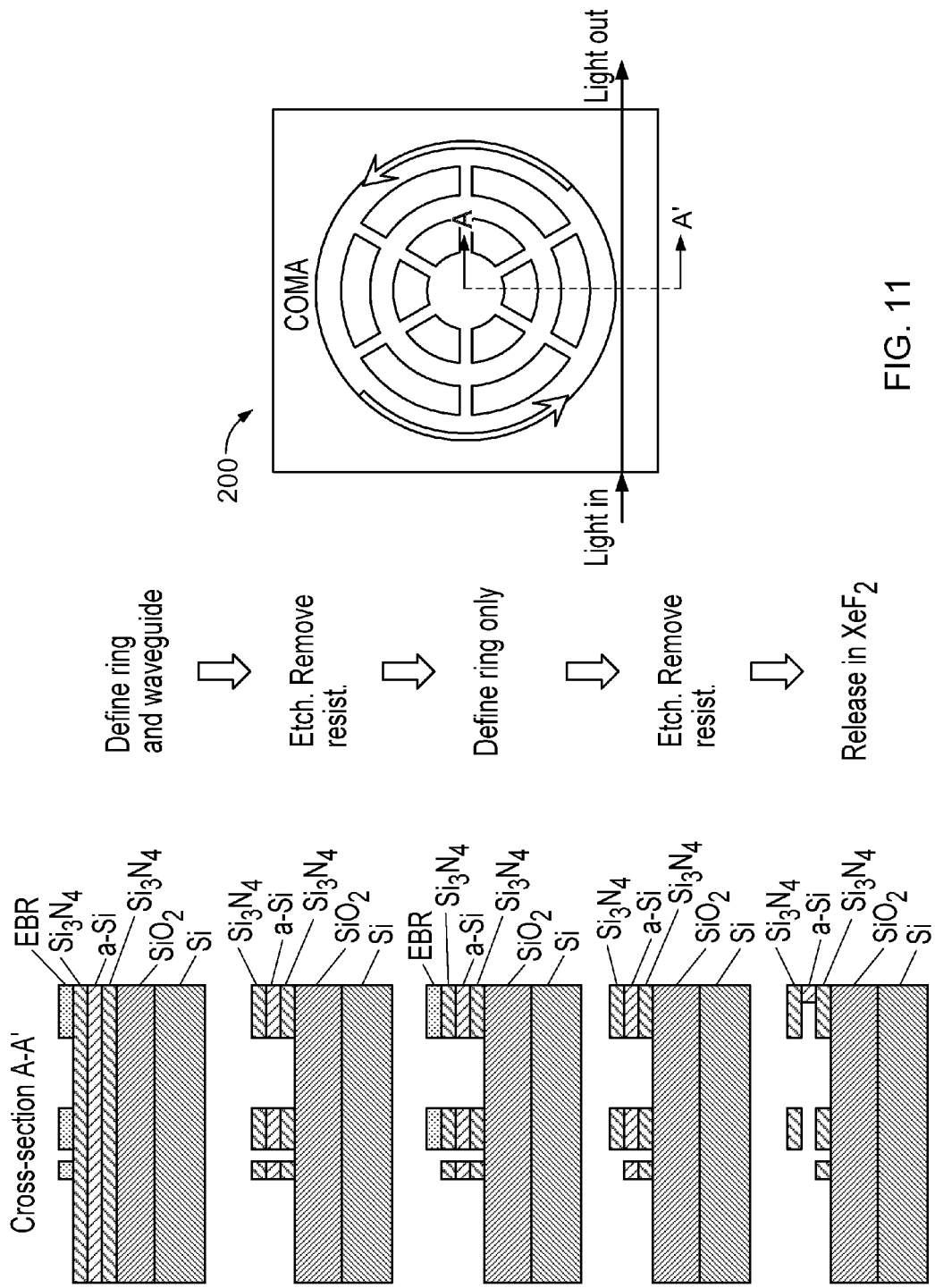
FIG. 11 shows an exemplary fabrication process for fabricating an optomechanical sensor device having on two optically coupled optical resonators in form of disk optical cavities.

FIG. 11 shows a schematic of a fabrication process to fabricate the exemplary COMA device 200 including a composite optical resonator with disk optical cavities. Schematic illustrations of the fabrication process schematic are shown for a cross section A-A' of the COMA device 200. The fabrication process can include growing a low index layer, e.g., an oxide layer (e.g., to a 4 µm thick $SiO_2$ layer), on a Si layer to form the substrate. The fabrication process can include depositing a lower $Si_3N_4$ layer (e.g., with a 220 nm thickness), an amorphous silicon (a-Si) layer (e.g., with a 180 nm thickness), and an upper $Si_3N_4$ layer (e.g., with a 220 nm thickness) using low pressure chemical vapor deposition (LPCVD) techniques. The fabrication process can include implementing lithography techniques to define the ring and the waveguide for a first etching. For example, a spoked wheel shape of the moveable upper and fixed lower ring optical cavities and the waveguide can be defined using photoresist and edge beam removal (EBR) processes. The structures can be formed by etching through the $Si_3N_4$-a-Si—$Si_3N_4$ stack by implementing reactive ion etching (RIE), e.g., using $CHF_3/O_2$ chemistry. The fabrication process can include implementing lithography techniques to define the ring only for a second etching. For example, the ring structure can be protected using photoresist, and the upper silicon nitride layer of the waveguide can be etched, e.g., using RIE. The fabrication process can include removing the a-Si sacrificial layer (e.g., by etching using $XeF_2$) to release the upper ring. For example, the upwards curling of the upper layer after release can prevent the upper nitride layer from sticking to the lower nitride layer during $XeF_2$ release. After release, the spokes of the ring structure curl upwards due to stress, resulting in a final ring-ring gap which is larger than the original gap.

Figure 12A:
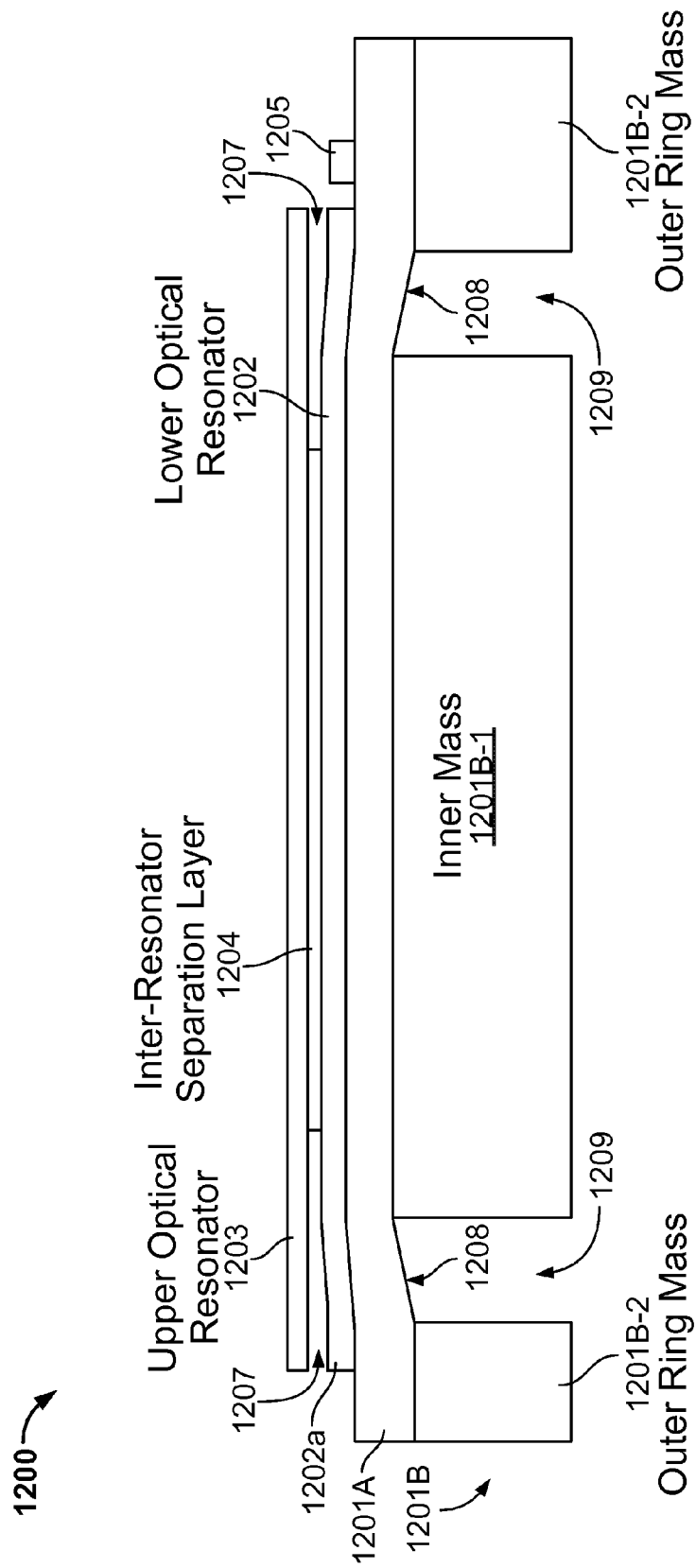
FIG. 12A shows an exemplary optomechanical sensor device based on two optically coupled optical resonators.

In the optomechanical sensing devices in FIGS. 1A and 2A, the entire of the one of the two coupled optical resonators is engaged to a suspension and thus can move relative to the fixed resonator. In other designs, of the two coupled optical resonators, one optical resonator may only include a portion that is movable relative to the other optical resonator while other parts of the resonator are fixed. FIG. 12A shows an exemplary composite optical resonator 1200 of an optomechanical sensor device to illustrate a sensor design in which the first optical cavity is configured to include one portion of the first optical cavity that deforms or moves with respect to the second optical cavity while remaining portion of the first optical cavity is fixed in position relative to the second optical cavity.

In FIG. 12A, the exemplary composite optical resonator 1200 can be configured as two stacked optical cavities, in which a lower optical cavity 1202 is fixed to a substrate with two substrate layers 1201A and 1201B and an upper optical cavity 1203 is positioned above and separated from the lower optical cavity 1202 by an inter-resonator separation layer 1204, which may be, e.g., a passivation layer. The two optical cavities 1202 and 1203 may be two disk resonators which, in some implementations, are configured to confine circulating light at the rim of each disk resonator in one or more optical whispering gallery modes, and in other implementations, can be configured as photonic crystal cavities with photonic crystal structures at the outer rims. The peripheral region near the outer rims of the two disk resonators 1202 and 1203 may be removed to form a peripheral gap 1207 between the outer rims of the two disk resonators 1202 and 1203.

The upper substrate layer 1201A is a flat layer in direct contact with the lower optical cavity 1202 and lower substrate layer 1201B is configured to be a thick layer and is patterned to include a ring groove 1209 under the inter-resonator gap 1207. This ring groove 1209 can be in various shapes, e.g., a circular ring, a squire ring, or a rectangular ring and creates an inner mass 1201B-1 and an outer ring mass 1201B-2. In effect, the void in the thick substrate layer 1201B due to the ring groove 1209 creates a mechanically relatively flexible region to allow the region 1208 to bend when the structure is subject to a force or acceleration. In some implementations, the outer ring mass 1201B-2 may be fixed in position while allowing the inner mass 1201B-1 to suspend and to move in response to the applied force or acceleration so that the inner mass 1201B-1 serves as part of the proof mass for the sensor device. In other implementations, the inner mass 1201B-1 may be fixed in position while allowing the outer ring mass 1201B-2 to suspend and to move in response to the applied force or acceleration so that the outer ring mass 1201B-2 serves as part of the proof mass for the sensor device. In both implementations, when the device is subject to an acceleration along a direction perpendicular to the substrate, the force exerted on the upper substrate layer 1201A causes the upper substrate layer 1201A to bend at the bending region 1208. This bending region 1208 in the upper substrate layer 1201A causes the outer rim part 1202a of the lower optical cavity 1202 to bend, thus changing the spacing 1207. This structure in effect causes the upper substrate layer 1201A to function both as a substrate layer for supporting the lower optical cavity 1202 and as a spring structure to cause the outer rim of the lower optical cavity 1202 to change its position relative to the outer rim of the upper optical cavity 1203.

In implementations, the lower substrate layer 1201B is a thick substrate which can be a silicon or other semiconductor material. The upper substrate layer 1201A in direct contact with the lower optical cavity 1202 can be a thin layer formed over the substrate layer 1201B, e.g., a oxide or nitride layer. In some devices, the substrate layer 1201B and the passivation layer 1204 can be formed of silicon based materials.

In FIG. 12A, an optical coupler 1205 is formed in the layer of the lower optical cavity 1202 on the upper substrate layer 1201A and is configured to couple light into the composite optical resonator via the lower optical cavity 1202. For example, the optical coupler 1205 can be configured as an integrated optical waveguide coupler. In some implementations, the exemplary composite optical resonator 1200 can be operated as a z-axis motion sensor device which uses waveguided light (e.g., provided by the optical coupler 1205) to sense proof mass displacement of the bending region 1208 that corresponds to the motion of the device in a z-axis direction through the plane of the substrate 1201. For example, the bending region 1208 of the lower optical cavity 1202 moves due to the z-axis motion, which causes a displacement in the gap 1207 formed between the lower optical cavity 1202 and the upper optical cavity 1203, such that the optical coupling between the two resonators 1202 and 1203 changes to shift the resonant frequency of the optical mode. Different from the sensors in FIGS. 1A and 2A, the central part of the lower optical cavity 1202 is fixed in position relative to the upper optical cavity 1203 but the outer rim 1202a of the lower optical cavity 1202 can move relative to the outer rim of the upper optical resonator 1203.

Figure 12B:
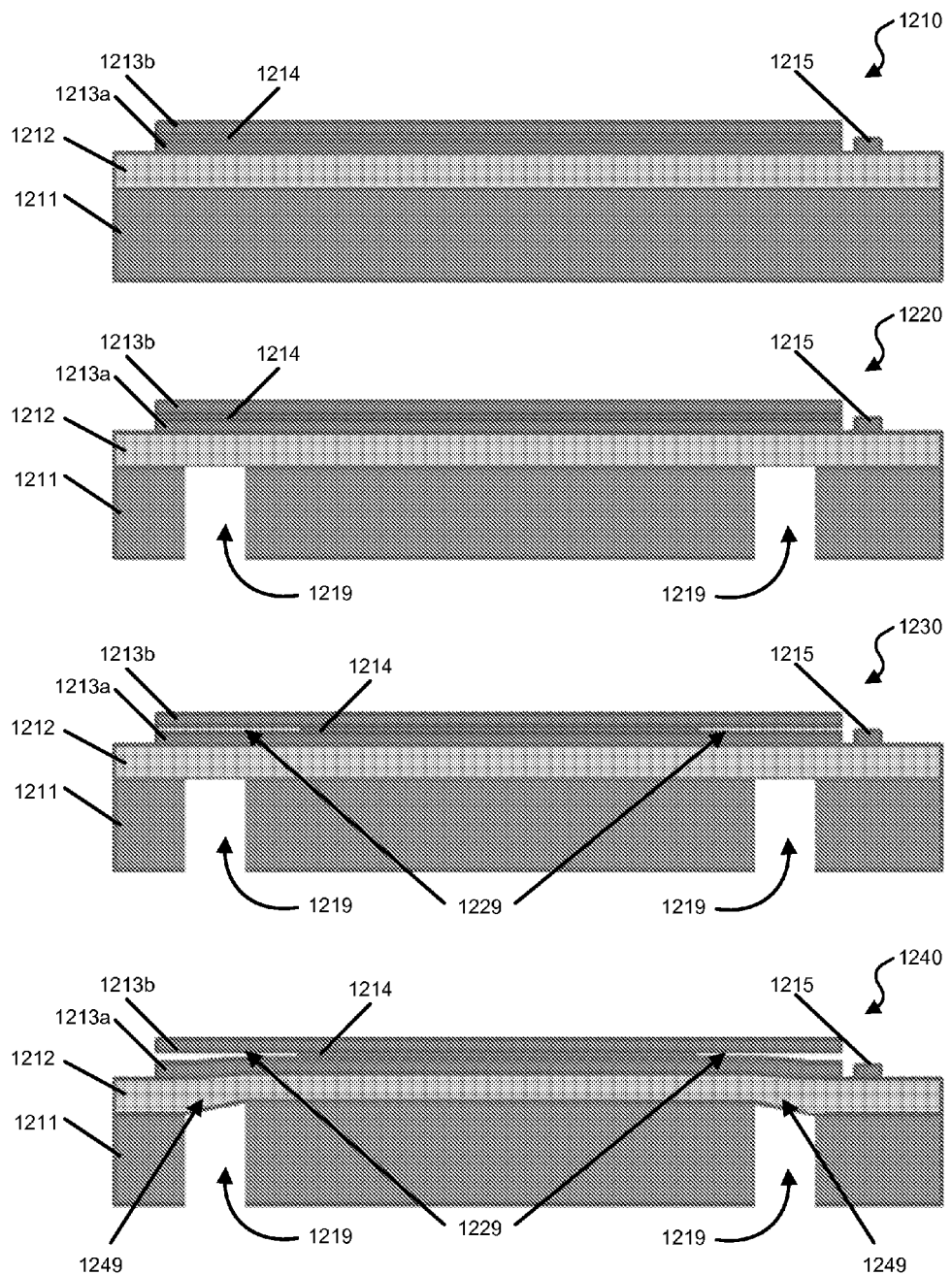
FIG. 12B shows a schematic of a method to fabricate the sensor in FIG. 12A.

FIG. 12B shows a schematic of a method to fabricate the composite optical resonator 1200. The fabrication method can include a process 1210 to grow an oxide layer 1212 on a Si layer 1211 to form the substrate layers 1201A and 1201B and deposit a bottom layer 1213a of the lower optical cavity material, a middle layer 1214 of the passivation layer material, and a top layer 1213b of the upper optical cavity material, e.g., by using LPCVD techniques. The depositing step of the process 1210 can also include depositing a layer 1215 near the bottom layer 1213a to form the optical coupler 1205. The fabrication method can include a process 1220 to cut grooves 1219 into the substrate 1201B, e.g., by implementing deep reactive ion etching (DRIE). The fabrication method can include a process 1230 to form a gap 1229 between the bottom layer 1213a and the top layer 1213b by removing an outer portion of the middle layer 1214 of the passivation layer material (e.g., by etching using $XeF_2$). The fabrication method can include a process 1240 to facilitate a deformation of the bottom layer 1213a at a bending region 1249.

The present optomechanical sensing devices can be designed by using two coupled optical resonators formed by photonic crystal cavities. Photonic crystal cavities can be formed in a layer that is transparent at the optical wavelength of interest and the layer can be formed of various materials, such as semiconductor layers, dielectric layers and others. Photonic crystal cavity structures can be designed in configurations that provide beneficial or unique designs for optomechanical sensing.

Figure 13A:
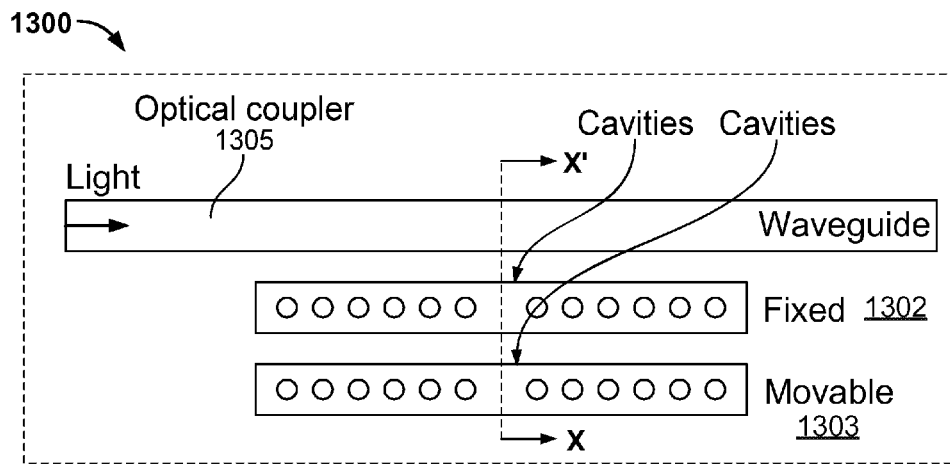
FIGS. 13A and 13B show schematics of an exemplary optomechanical sensor device.
Figure 13B:
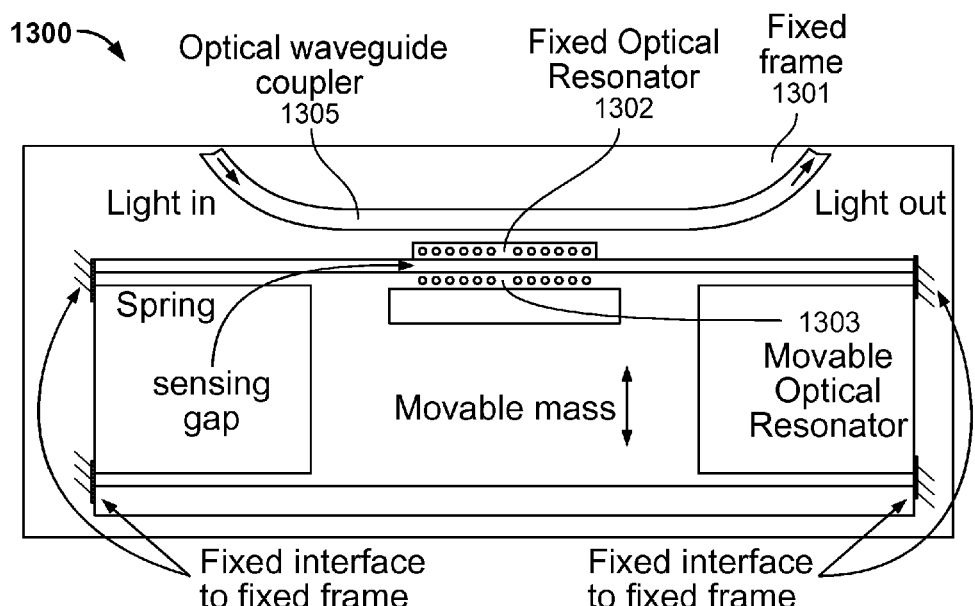

FIGS. 13A and 13B show a top view of an exemplary optomechanical sensor device 1300 having two optical resonators 1302 and 1303 formed of photonic crystal cavities. The device 1300 includes a fixed frame 1301 that supports a first optical resonator 1302 and an optical coupler 1305 that are fixed to the frame 1301. The optical coupler 1305 coupling input laser light into the first optical resonator 1302 and couples confined light in the first optical resonator 1302 out as the sensor light. A second optical resonator 1303 is attached to a moveable mass region coupled to the frame 1301 and is located near the first optical resonator 1302 so the two resonators 1302 and 1303 are optically coupled to each other. The moveable mass region is coupled to the frame 1301 by a suspension mechanism (e.g., including springs) that are attached at a fixed position or interface with the fixed frame 1301. The suspension mechanism (e.g., springs) enables the second optical resonator 1303 to move relative to the first optical resonator 1302, e.g., thereby altering the distance of separation between the two optical resonators 1302 and 1303, which is marked as the sensing gap in FIG. 13A. For example, the optical resonance of the first resonator 1302 varies with a spacing between first and second optical resonators 1302 and 1303 when the second optical resonator 1303 moves or deforms with respect to the first optical resonator 1302, e.g., under action of a force or acceleration. In some implementations, the optical coupler 1305 can be configured as an optical evanescent coupler. The optical coupler 1305 can be integrated to the fixed frame. For example, the device can include a detection unit that detects a change in the optical resonance with respect to the spacing between the first and second optical cavities to measure a motion based on the detected change. In some implementations, the device 1300 can be operated as a x-axis and y-axis accelerometer device which uses the waveguided light provided by optical coupler 1305 to sense proof mass displacement that corresponds to the acceleration of the device in one or more directions parallel to the fixed frame 1301 (e.g., the x-y plane). For example, a force acted upon the device may result in a detectable movement of the moveable mass region, in which a displacement in the gap formed between the first optical resonator 1302 and the second optical resonator 1303 in the x-y plane occurs and the effective refractive index changes, changing the optical path length and therefore the resonant frequency of the optical mode.

Figure 13C:
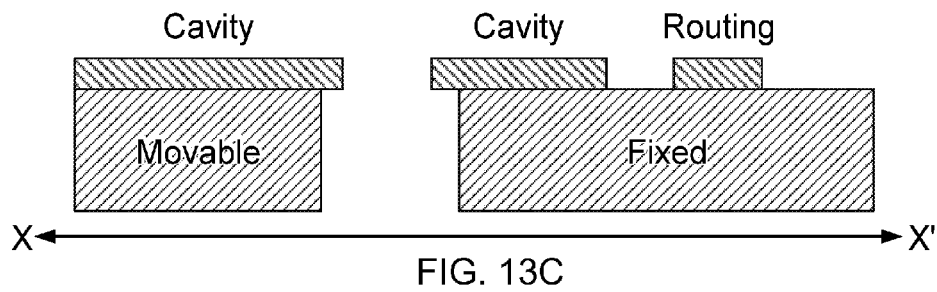
FIG. 13C shows a schematic of the cross sectional view of a sensor based on two optically coupled optical resonators.

FIG. 13C shows a schematic of the cross sectional view of the device 1300 along a cross section A-A' as shown in FIG. 13A.

Figure 13D:
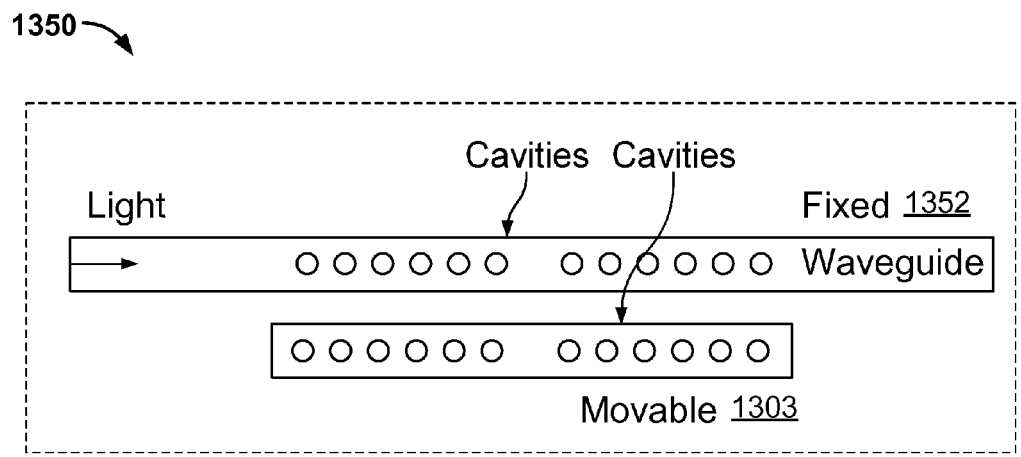
FIGS. 13D and 13E show schematics of an exemplary optomechanical sensor device based on two optically coupled optical resonators.
Figure 13E:
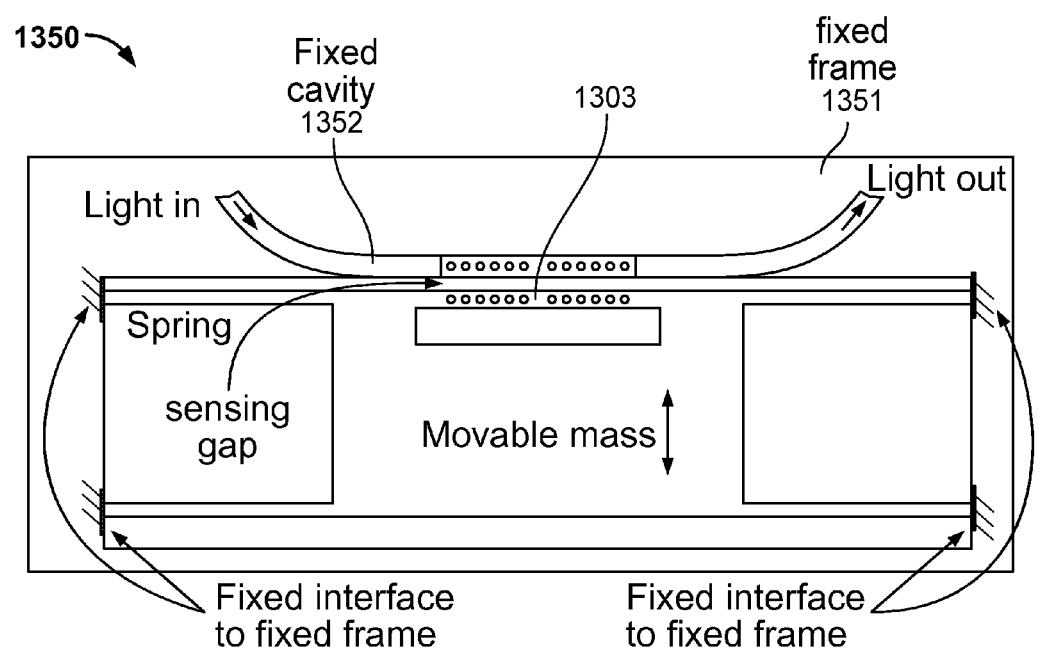

FIGS. 13D and 13E show a top view of an exemplary optomechanical sensor device 1350 as an alternative design to the designs in FIGS. 13A-C. Notably, the first optical resonator 1352 is formed in a waveguide section of an optical waveguide fixed to the fix frame. Therefore, the designated optical waveguide in FIGS. 13A-C for coupling light into the two cavities and for coupling light out of the cavities for the sensor measurement is eliminated in the current design. The optical detector can be coupled to one of the two optical waveguides in which the two optical cavities 1303 and 1352 with photonic crystal cavities are formed to receive sensor light for detecting the spacing between the two cavities 1303 and 1352. A laser, which may be integrated on the same substrate, can be coupled to supply the laser light into the optical waveguide for the fixed cavity 1352 to provide the desired frequency detuned light into the optical cavities 1303 and 1352 for the optomechanical sensing operation. The device 1350 includes a fixed frame 1351 that supports a first optical resonator 1352 fixed to the frame 1351.

Figure 14:
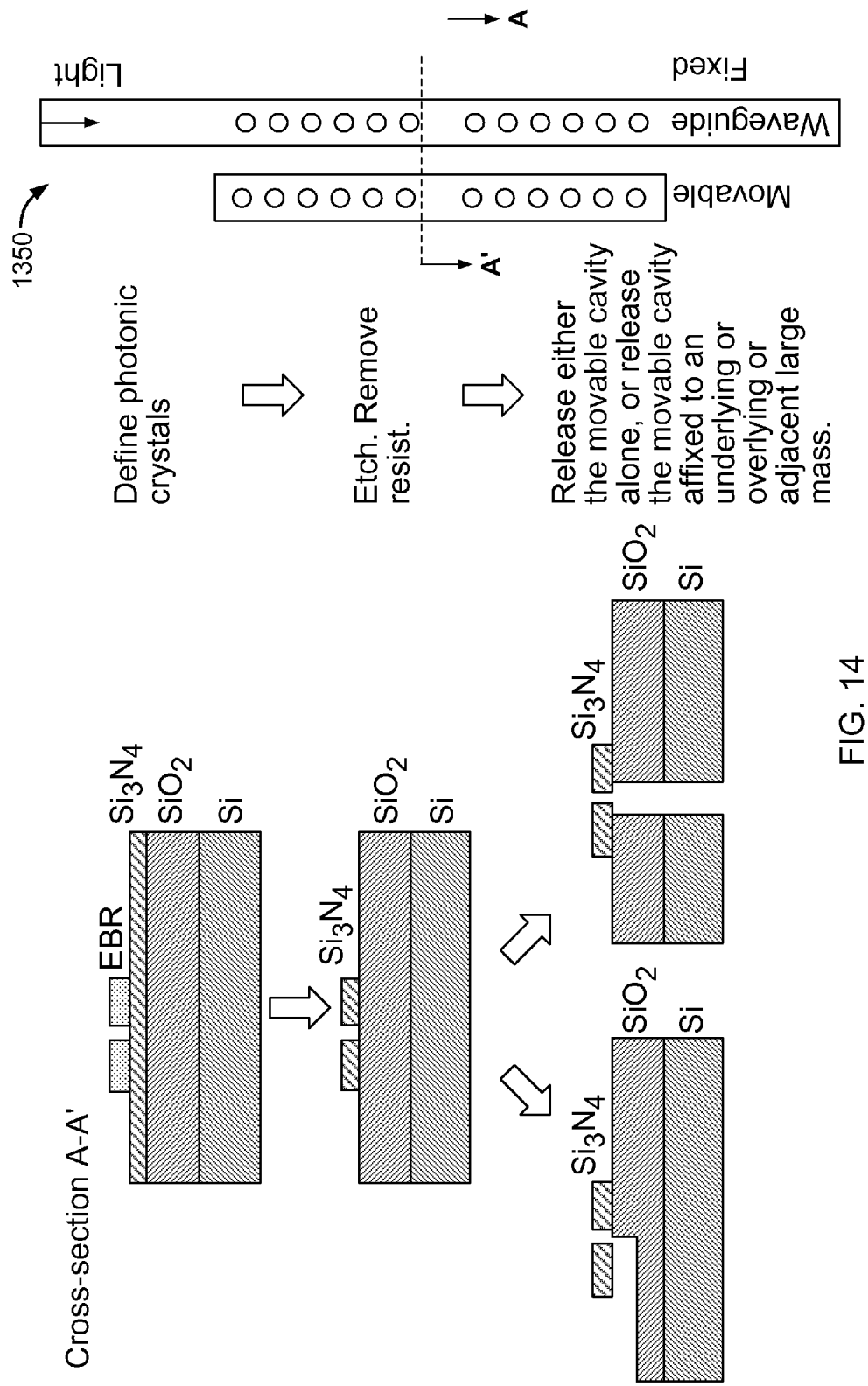
FIG. 14 shows a schematic of a method to fabricate a sensor based on two optically coupled optical resonators.

FIG. 14 shows a schematic of a method to fabricate the composite optical resonator 1350. The fabrication method can include a process to define the lower and upper optical cavities structures 1352 and 1353 on the substrate 1351. For example, the substrate 1353 can include a silicon oxide layer on a Si layer. For example, a layer of silicon nitride layer, which can be used to form the optical cavities (e.g., which can be configured as photonic crystals) is configured on the silicon oxide layer. The fabrication method can include implementing lithography techniques to define the optical cavities for etching their structures on the substrate 151. For example, the optical cavity and upper optical cavity structures can be protected using photoresist, and the design can be etched out of the silicon nitride layer, e.g., using RIE. The fabrication method can include removing a region of the silicon oxide layer or the silicon oxide and silicon layers (e.g., by etching using $XeF_2$) to release the upper optical cavity structure to form the moveable mass region.

Figure 15A:
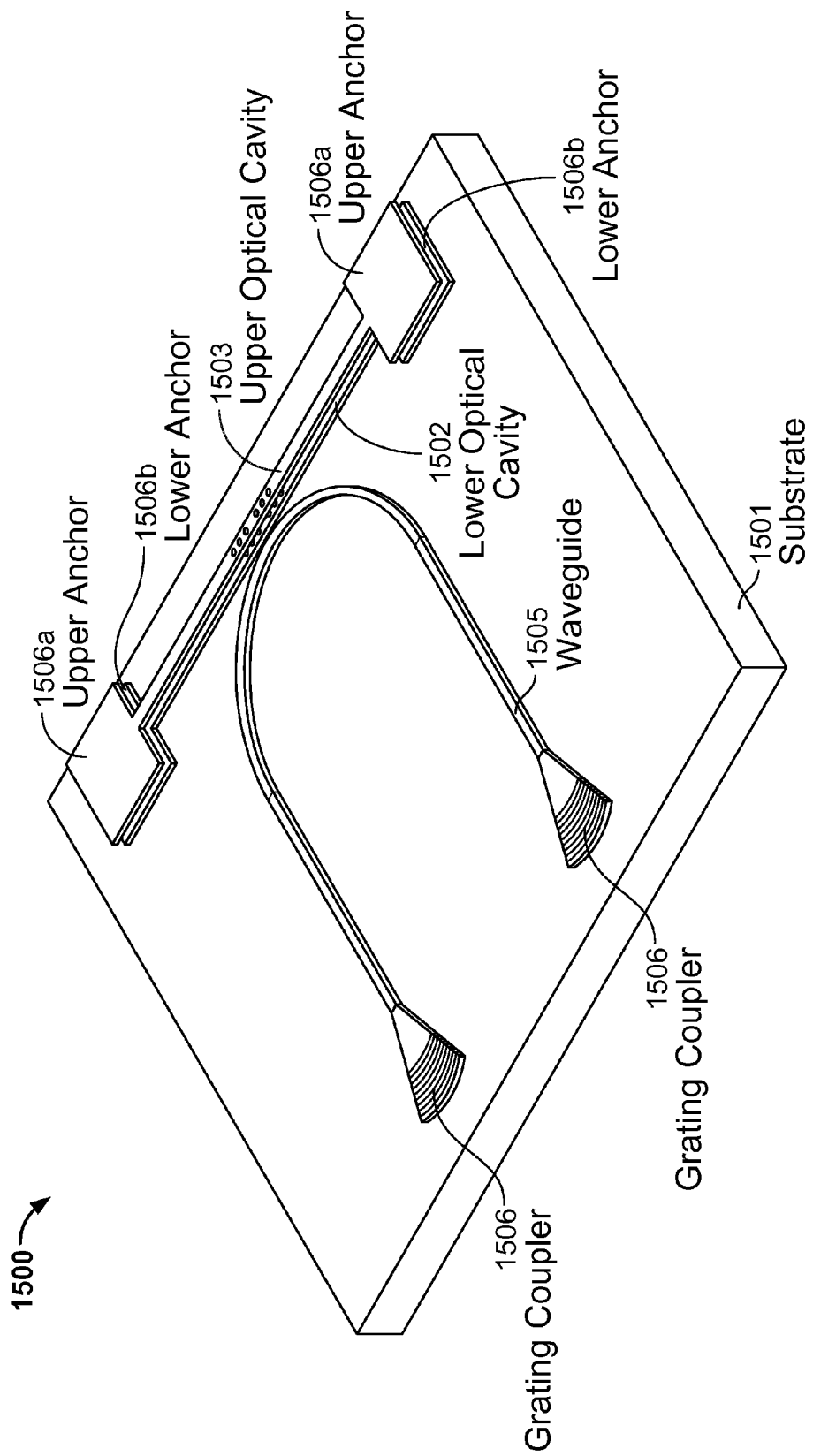
FIG. 15A shows a schematic of another exemplary optomechanical sensor that includes on two optically coupled optical resonators.

FIG. 15A shows a schematic of another exemplary optomechanical sensor device 1500 that includes photonic crystal cavities. The device 1500 includes a stacked optical cavities configuration, e.g., including a lower optical cavity 1502 formed in a lower suspension arm that is fixed to a substrate 1501 and below an upper optical cavity 1503 formed in an upper suspension arm that is free to move with respect to the lower optical cavity 1502. The lower and upper suspension arms are fixed to upper anchor structures 1506a and lower anchor structures 1506b. The composite optical resonator can also include an integrated optical coupler 1505, e.g., such as a waveguide, fixed to the substrate and positioned substantially next to the lower optical cavity 1502 to couple light into the composite optical resonator 1500. For example, light is evanescently coupled into the photonic crystals of the composite optical resonator 1500 by the optical coupler 1505, in which the light circulates within the exemplary photonic crystal optical cavities. Motion causes the upper optical cavity 1503 to move, thereby altering the gap spacing and changing the optical resonance frequency, which is measured as optical intensity variation at the output.

Figure 15B:
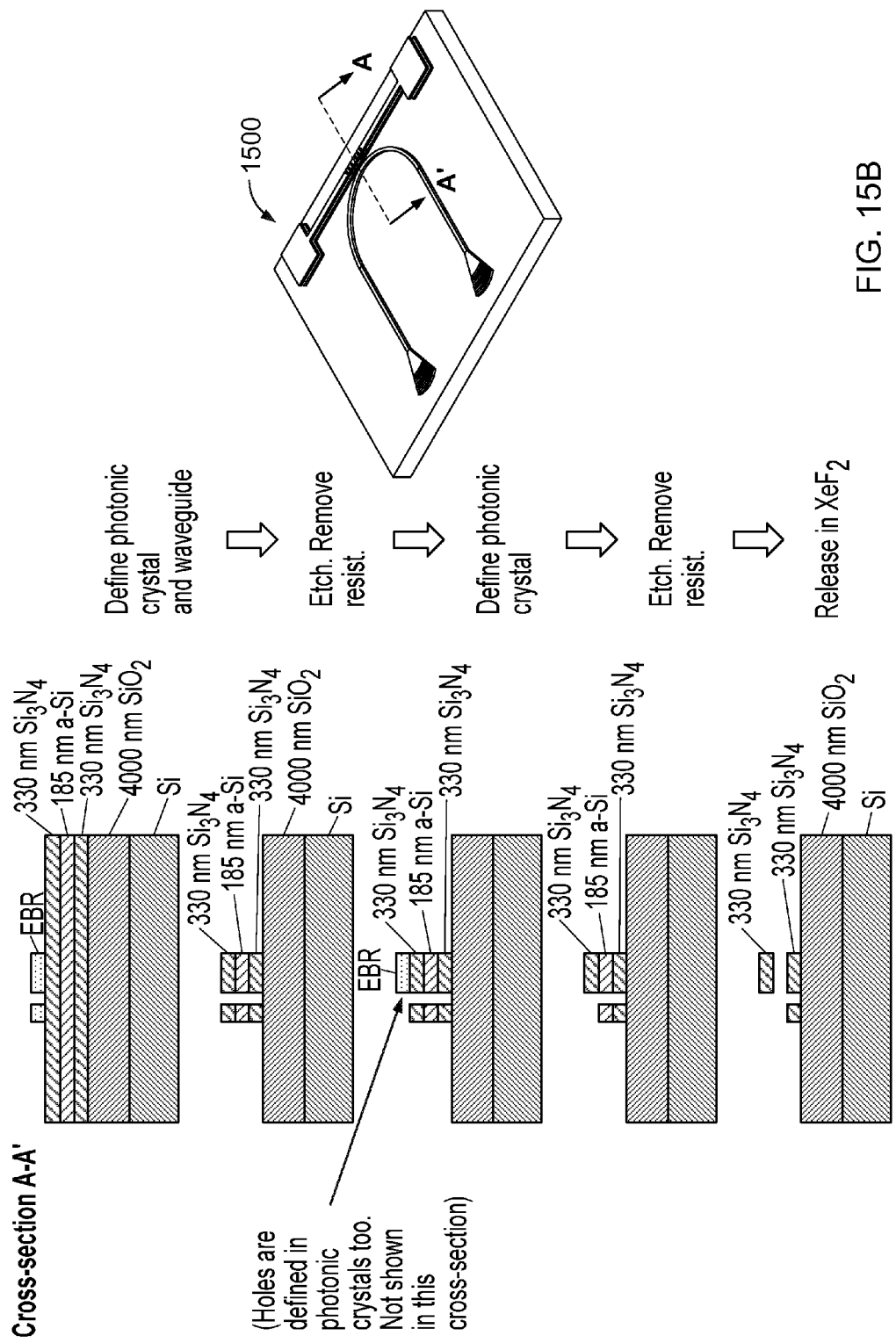
FIG. 15B shows an exemplary fabrication process schematic of an exemplary sensor on two optically coupled optical resonators including photonic crystal optical cavities.

FIG. 15B shows a schematic of a fabrication process to fabricate the exemplary device 1500 with photonic crystal optical cavities. Schematic illustrations of the fabrication process schematic are shown for a cross section A-A' of the device 1500. The fabrication process can include defining the optical cavities and waveguide structures on a template material including an oxide layer (e.g., to a 4 µm thick $SiO_2$ layer) on a Si layer that forms the substrate with deposited silicon nitride-amorphous silicon-silicon nitride layers. The fabrication process can include implementing lithography techniques to define the optical cavities and the waveguide for a first etching. The optical cavity and waveguide structures can be formed by etching through the layers (while protecting the photonic crystal regions of those layers) by implementing reactive ion etching (RIE). The fabrication process can include implementing lithography techniques to protect the optical cavities only for a second etching. For example, the photonic crystal optical cavity structure can be protected using photoresist, and the upper silicon nitride layer of the waveguide can be etched, e.g., using RIE. The fabrication process can include removing the a-Si sacrificial layer (e.g., by etching using $XeF_2$) to release the upper optical cavity.

Figure 15C:
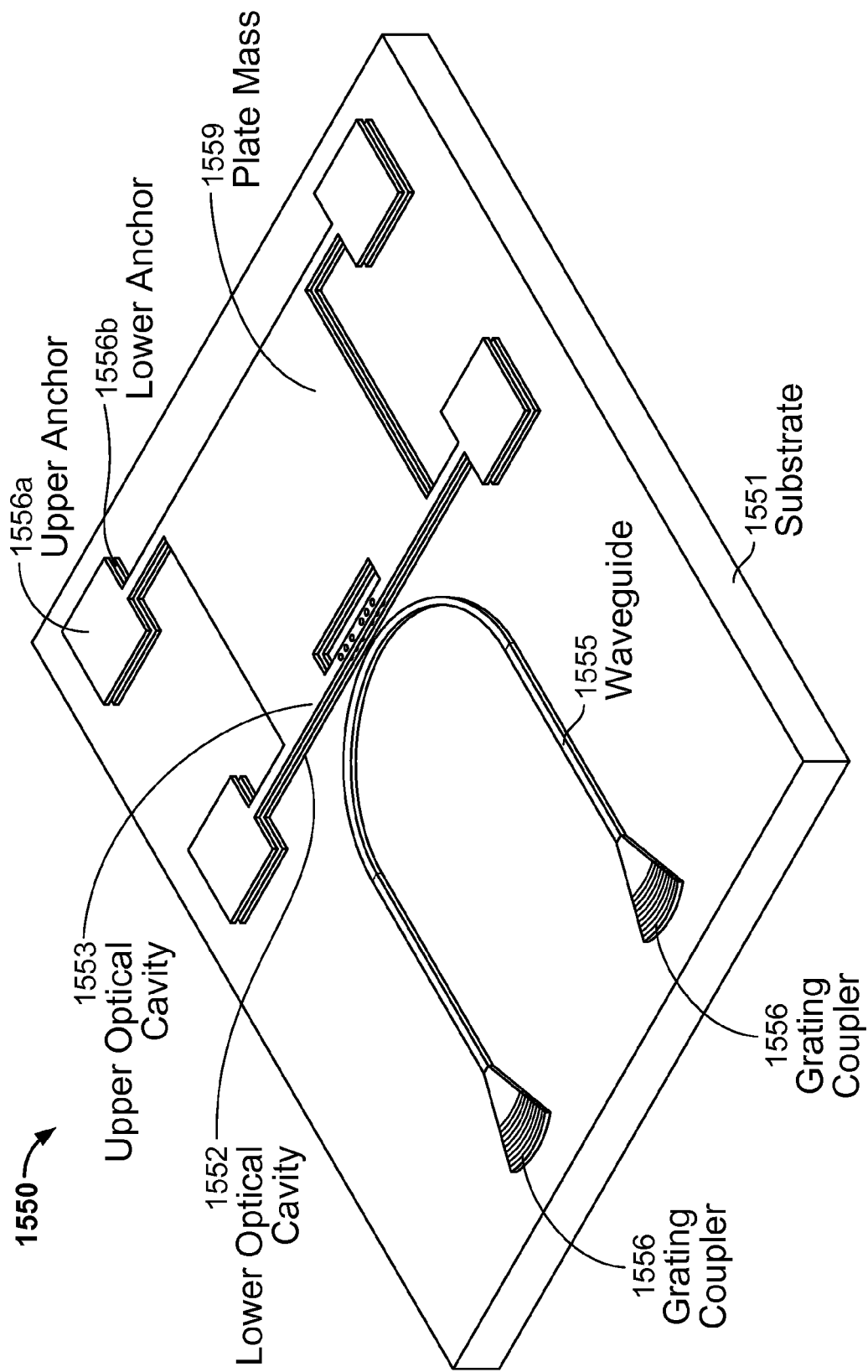
FIG. 15C shows a schematic of exemplary optomechanical sensors on a single substrate that include two optically coupled optical resonators.

FIG. 15C shows a schematic of exemplary optomechanical sensors on a single substrate that includes a sensor device 1550. The device 1550 includes a stacked optical cavities configuration in a first device (device 1), e.g., including a lower optical cavity 1552 fixed to a substrate 1551 and below an upper optical cavity 1553 coupled to and free to move with respect to the lower optical cavity 1552 via a suspension located between an upper anchor structure 1556a and a lower anchor structure 1556b, located at the ends of the optical cavities. For example, the lower and upper optical cavities 1552 and 1553 can be configured as photonic crystal cavities. A mass plate 1559 is provided from each of the lower optical cavity 1552 and upper optical cavity 1553 that spans perpendicular to the optical cavities to increase the effective proof mass for the sensor device 1500. An additional mass comprised of part of the underlying substrate or comprised of some material added on top of the mass plate, may be attached to this mass plate. An integrated optical coupler 1555, e.g., such as a waveguide, is fixed to the substrate and positioned substantially next to the lower optical cavity 1552 to couple light into the device 1550. For example, light is evanescently coupled into the photonic crystals of the composite optical resonator 1550 by the optical coupler 1555, in which the light circulates within the exemplary photonic crystal optical cavities. Motion causes the upper optical cavity 1553 to move, thereby altering the gap spacing and changing the optical resonance frequency, which is measured as optical intensity variation at the output.

In the examples above, the optomechanical sensing is used to measure a change in a spacing, a motion or acceleration. The present optomechanical sensing may also be used to measure other parameters.

Figure 16A:
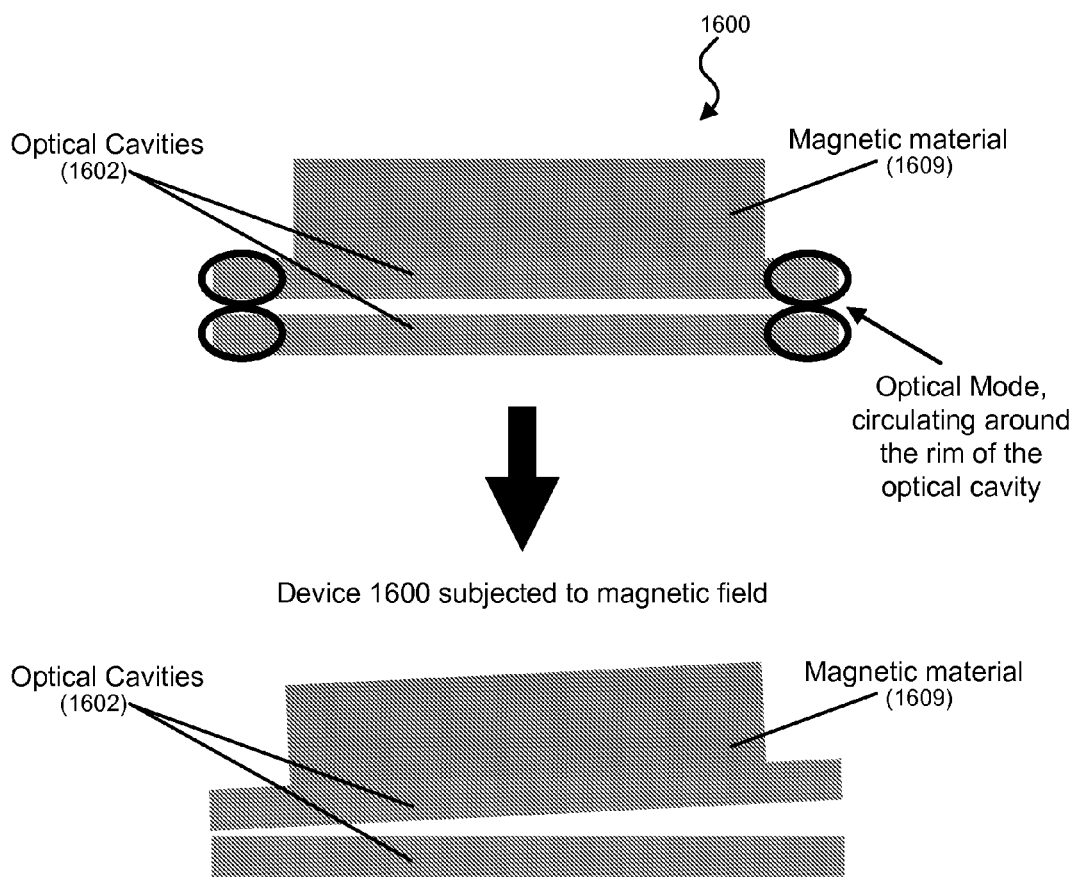
FIGS. 16A and 16B show examples of magnetometer based on two optically coupled optical resonators.
Figure 16B:
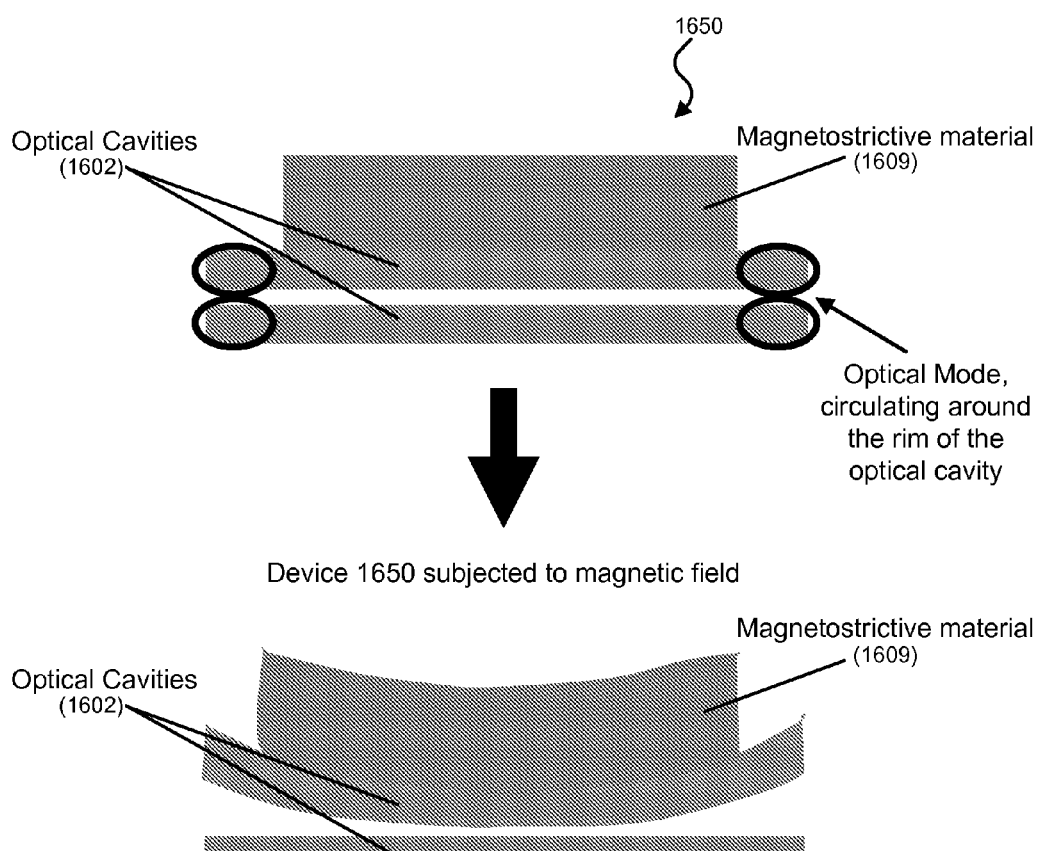

FIGS. 16A and 16B show exemplary magnetometer devices based on the disclosed optomechanical sensing.

FIG. 16A shows a magnetometer device 1600 that includes two optical cavities 1602 including a first optical cavity and a second optical cavity, in which the second optical cavity is separated from the first optical cavity by a distance that provides optical coupling between first and second optical cavities to form a composite optical resonator that exhibits an optical resonance that varies with a spacing between first and second optical cavities. The composite optical resonator 1600 also includes a magnetic material 1609 (e.g., a ferromagnetic material) coupled to the moveable optical cavity (e.g., the second optical cavity) that moves in response to an external magnetic field that changes the spacing between the first and second optical cavities. The magnetic material 1609 can include a magnetic material, e.g., including, but not limited to iron, nickel, or cobalt based materials. The device 1600 can be configured with a detection unit that detects a change in the optical resonance with respect to the spacing between the first and second optical cavities, in which the detection unit measures magnetism based on the detected change. In some implementations, the device 1600 can be configured to use various optical resonator designs in this document.

FIG. 16B shows a magnetometer device 1650 that includes two optical cavities 1652 including a first optical cavity and a second optical cavity, in which the second optical cavity is separated from the first optical cavity by a distance that provides optical coupling between first and second optical cavities to form a composite optical resonator that exhibits an optical resonance that varies with a spacing between first and second optical cavities. The device 1650 also includes a magnetostrictive material 1659 coupled to the second optical cavity that deforms the optical cavity in response to an external magnetic field that changes the spacing between the first and second optical cavities. The magnetostrictive material 1659 can include Terfenol-D or Metglas. The device can be configured with a detection unit that detects a change in the optical resonance with respect to the spacing between the first and second optical cavities, in which the detection unit measures magnetism based on the detected change. Other optical resonator designs can be used for the device 1650.

The present optomechanical sensing based on two optically coupled optical resonators can also be used for construct gyroscopes for sensing rotation. Gyroscopes can be constructed from micromachined parts, such as microelectromecnical systems (MEMS), on silicon and other substrates to use a vibrating mass or proof mass to sense rotation. MEMS gyroscopes can be widely used in various devices, including mobile computing devices or mobile communication devices. Some application examples of MEMS gyroscopes are vehicle stability control, GPS assist, vehicle rollover protection, game console controllers, camcorder stabilization and smartphones.

Figure 17:
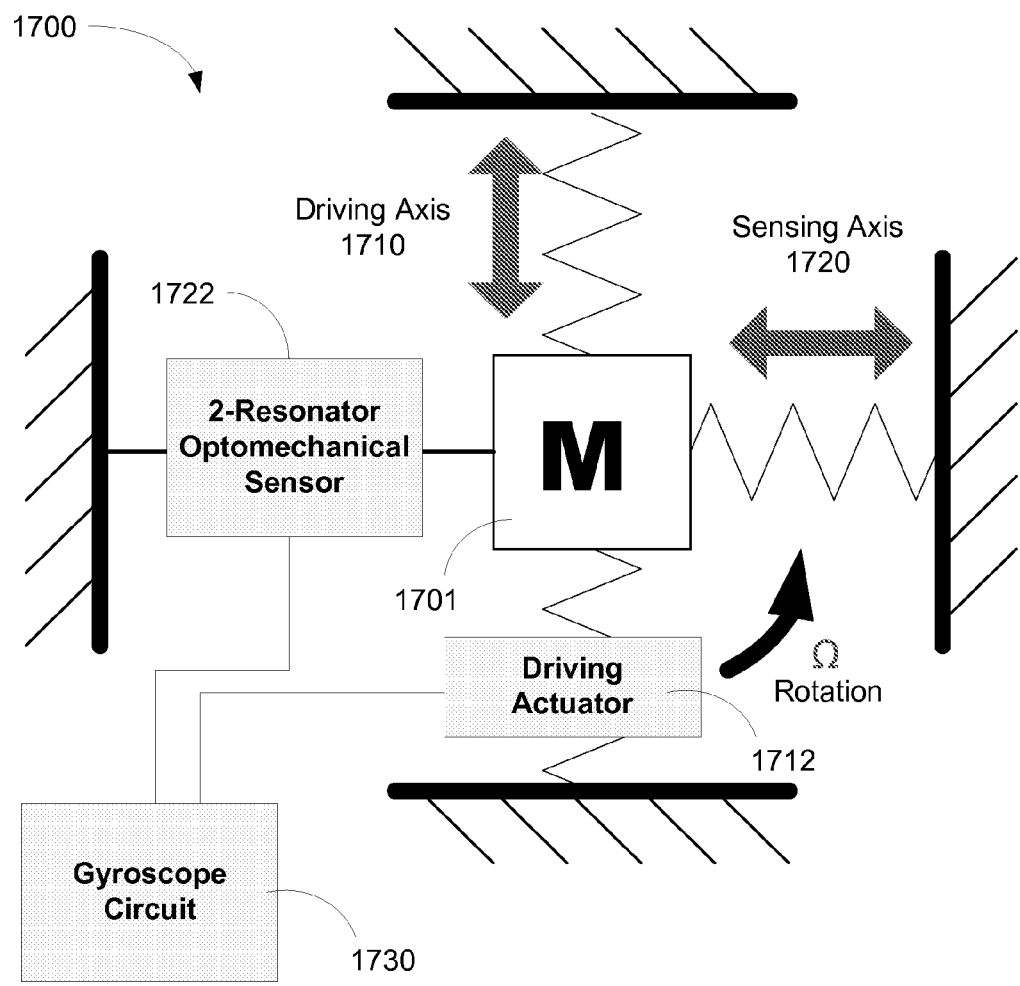
FIGS. 17 and 18 show examples of gyroscopes that measure rotation based on optomechanical sensing using two optically coupled optical resonators.

FIG. 17 shows an example of a gyroscope 1700 that uses a vibrating mass 1701 coupled to modes of mechanical motion and measures the rotation rate by measurements of the vibrating mass based on the Coriolis Effect via optomechanical sensing by two optically coupled optical resonators. The vibrating mass 1701 is free to move in two different mechanical modes, e.g., two orthogonal mechanical modes, in one of the modes (known as drive mode) the vibrating mass 1701 is engaged to a driving actuator 1712 into oscillation by an oscillatory driving force, e.g., an electrostatic force, electromagnetic force, piezoelectric force, or optomechanical force, along a driving axis 1710. A spring or other engagement mechanism can be provided to constrain the motion of the vibrating mass 1701 along the driving axis 1710. Similarly, another spring or engagement mechanism is provided to constrain the motion of the vibrating mass 1701 in the other orthogonal mechanical mode along a sensing axis 1720 which is different from the driving axis 1710. An optomechanical sensor 1722 based on two optically coupled optical resonators is coupled to the vibrating mass to sense the motion of the vibrating mass 1701 along the sensing axis 1720.

When the gyroscope device 1700 is subject to a rotation, the oscillating motion of the vibrating mass 1701 in the driving mode is coupled into the orthogonal mode (or sense mode), where the coupling strength is proportional to the rotation rate. Therefore, the rotation rate can be determined by measuring the motion of the vibrating mass 1701 that is transferred into the sense mode by the rotation. The optomechanical sensing described in this document can be implemented in various gyroscope configurations, including MEMS gyroscopes, in ways that achieve improved resolution and sensitivity in rotation rate measurements. As shown in FIG. 17, a gyroscope circuit 1730 is provided to process the output signal from the optomechanical sensor for sensing the motion of the vibrating mass 1701 in the sensing axis 1720 and to generate the rotation rate.

Figure 18:
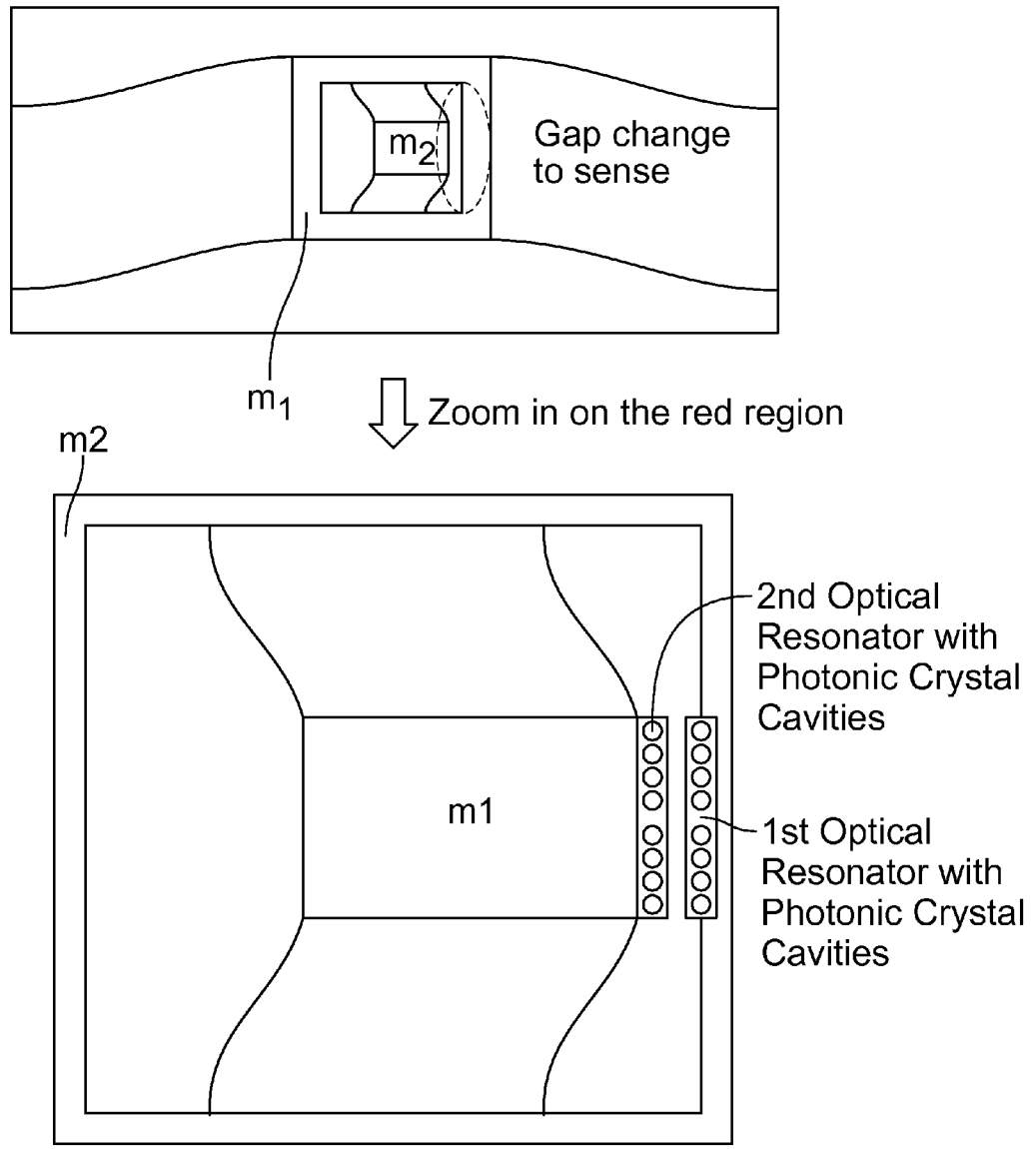

FIG. 18 shows an example of a gyroscope having two vibrating mass members m1 and m2 based on the gyroscope design in FIG. 17 with optomechanical sensing. In this example, the gyroscope's vibrating mass includes a frame m1 that is coupled to move along the driving axis 1710 in FIG. 17, and in absence of rotation, the rotation sensing mass m2 is coupled to the frame m1 and moves with the frame m1 along the driving axis 1701. Therefore, in absence of rotation, masses m1 and m2 both move along the driving axis 1710. With an applied rotation $\Omega$, the Coriolis force causes m2 to have a rotation-induced motion along the sensing axis 1720. The displacement of m2 along the sensing axis 1720 is measured by using two optically coupled resonators, such as resonators formed of photonic crystal cavities, to determine the rotation speed $\Omega$.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A device for optomechanical sensing of motion, comprising:
    a substrate on which a first optical cavity is fixed;
    a second optical cavity separated from the first optical cavity by a distance that provides optical coupling between first and second optical cavities to produce an optical resonance that varies with a spacing between the first and second optical cavities;
    a suspension coupled between the first and second optical cavities to allow the second optical cavity to move or deform with respect to the first optical cavity under action of a force to change the spacing between the first and second optical cavities;
    an optical coupler that couples light into and out of the first and second optical cavities; and
    a detection unit that is coupled to receive and detect light coming out of the optical coupler and extracts from the detected light a change in the optical resonance with respect to the spacing between the first and second optical cavities to measure motion based on the detected change.

2. The device as in claim 1, wherein the motion includes an acceleration or rotation.

3. The device as in claim 1, wherein the substrate is formed of silicon, the first and second optical cavities are formed of a silicon compound.

4. The device as in claim 1, comprising:
a dielectric layer formed between the substrate and the first optical cavity and having a refractive index less than refractive indices of the substrate and the first optical cavity.

5. The device as in claim 1, wherein the first and second optical cavities are coupled via evanescent optical coupling.

6. The device as in claim 1, wherein the optical coupler includes an optical evanescent coupler.

7. The device as in claim 6, further comprising a laser configured to generate the light that is detuned from the optical resonance.

8. The device as in claim 7, wherein the laser is integrated on the substrate.

9. The device as in claim 1, wherein the optical coupler includes a tapered fiber evanescent coupler.

10. The device as in claim 1, wherein the optical coupler includes a waveguide coupler.

11. The device as in claim 1, wherein the first and second optical cavities are optical ring resonators.

12. The device as in claim 1, wherein the first and second optical cavities are formed by photonic crystal cavities.

13. The device as in claim 1, wherein the first and second optical cavities are optical whispering gallery mode resonators.

14. The device as in claim 1, wherein the first and second optical cavities are identical resonators.

15. The device as in claim 1, wherein the first and second optical cavities are different from each other.

16. A method for optomechanical sensing of motion, comprising:
directing light into at least one of a first optical cavity and a second optical cavity that are optically coupled to each other and are structured to allow one to deform or move with respect to the other, wherein the first optical cavity and the second optical cavity are optically coupled to effectuate a single composite optical resonator having an optical resonance that varies with a spacing between the first and second optical cavities;
coupling light out of the first and second optical cavities as sensor light;
using the sensor light to detect a change in the optical resonance effectuated by the optical coupling between the first and second optical cavities with respect to a change of the spacing between the first and second optical cavities caused by a motion; and
using the detected change in the optical resonance to measure the motion.

17. The method as in claim 16, wherein the measured motion includes a rotation.

18. The method as in claim 16, wherein the measured motion includes an acceleration.

19. The method as in claim 16, comprising:
coupling the first optical cavity and the second optical cavity to each other to allow one portion of the first optical cavity to deform or move with respect to the second optical cavity.

20. The method as in claim 16, comprising:
coupling the first optical cavity and the second optical cavity to each other to allow entirety of the first optical cavity to move with respect to the second optical cavity.

21. The method as in claim 16, comprising:
engaging a magnetic or magnetostrictive material to the first optical cavity to detect magnetic field present at the first optical cavity based on the change in the optical resonance with respect to the spacing between the first and second optical cavities.

22. The method as in claim 16, wherein the motion includes at least one of a rotational acceleration or a rotational velocity.

23. The device as in claim 16, wherein the motion is a substantially linear motion including at least one of a translational acceleration or a translational velocity.

24. A device for optomechanical sensing of motion, comprising:
a substrate;
a first optical cavity formed on the substrate;
a second optical cavity separated from the first optical cavity and optically coupled to the first optical cavity to cause the optically coupled first and second optical cavities to form a single composite optical resonator which exhibits an optical resonance that varies with a spacing between the first and second optical cavities, wherein the second optical cavity is configured to move or deform with respect to the first optical cavity under action of a force to change the spacing between the first and second optical cavities;
an optical coupler that couples light into and out of the composite optical resonator; and
a detection unit that is coupled to receive and detect light coming out of the optical coupler and extracts from the detected light a change in the optical resonance with respect to the spacing between the first and second optical cavities to measure motion in one or more directions within a plane parallel to the substrate based on the detected change.

25. The device as in claim 24, wherein the detection unit is integrated on the substrate.

26. The device as in claim 24, comprising:
a laser formed on the substrate to generate laser light that is detuned from the optical resonance that varies with the spacing between first and second optical cavities, the laser being optically coupled by the optical coupler to direct the laser light into the first and second optical cavities.

27. The device as in claim 24, comprising:
a dielectric layer formed between the substrate and the first optical cavity and having a refractive index less than refractive indices of the substrate and the first optical cavity.

28. The device as in claim 24, wherein:
the first optical cavity is configured to include one portion of the first optical cavity that deforms or moves with respect to the second optical cavity while remaining portion of the first optical cavity is fixed in position relative to the second optical cavity.

29. The device as in claim 24, wherein:
the first and second optical cavities are structures having photonic crystal cavities.

30. The device as in claim 24, comprising:
a magnetic or magnetostrictive material engaged to the second optical cavity to detect magnetic field present at the second optical cavity based on the change in the optical resonance with respect to the spacing between the first and second optical cavities.

31. A device for optomechanical sensing of motion, comprising:
a substrate on which a first optical cavity is fixed;
a second optical cavity separated from the first optical cavity by a distance that provides optical coupling between first and second optical cavities to effectuate a combination of optically coupled first and second optical cavities as a single composite optical resonator which exhibits an optical resonance that varies with a spacing between the first and second optical cavities;

a suspension coupled between the first and second optical cavities to allow the second optical cavity to move or deform with respect to the first optical cavity under action of a force to change the spacing between the first and second optical cavities, thus allowing the optical resonance of the composite optical resonator to vary with the spacing;

an optical coupler that couples light into and out of the first and second optical cavities; and a detection unit that is coupled to receive and detect light coming out of the optical coupler and extracts from the detected light a change in the optical resonance with respect to the spacing between the first and second optical cavities to measure motion based on the detected change.

32. The device as in claim 31, wherein the motion includes an acceleration or rotation.

33. The device as in claim 31, wherein the substrate is formed of silicon, the first and second optical cavities are formed of a silicon compound.

34. The device as in claim 31, comprising:
a dielectric layer formed between the substrate and the first optical cavity and having a refractive index less than refractive indices of the substrate and the first optical cavity.

35. The device as in claim 31, wherein the first and second optical cavities are coupled via evanescent optical coupling.

36. The device as in claim 31, wherein the optical coupler includes an optical evanescent coupler.

37. The device as in claim 36, further comprising a laser configured to generate the light that is detuned from the optical resonance.

38. The device as in claim 37, wherein the laser is integrated on the substrate.

39. The device as in claim 24, wherein the optical coupler includes a tapered fiber evanescent coupler.

40. The device as in claim 24, wherein the optical coupler includes a waveguide coupler.

41. The device as in claim 24, wherein the first and second optical cavities are optical ring resonators.

42. The device as in claim 24, wherein the first and second optical cavities are formed by photonic crystal cavities.

43. The device as in claim 24, wherein the first and second optical cavities are optical whispering gallery mode resonators.

44. The device as in claim 24, wherein the first and second optical cavities are identical resonators.

45. The device as in claim 24, wherein the first and second optical cavities are different from each other.

* * * * *